United States Patent
Mori

(10) Patent No.: US 11,483,388 B2
(45) Date of Patent: Oct. 25, 2022

(54) DATA COLLECTION SYSTEM FOR COLLECTING MULTIPLE TYPES OF DATA ACQUIRED BY MULTIPLE VEHICLES AND METHOD OF DATA COLLECTION

(71) Applicant: Mitsubishi Electric Corporation, Tokyo (JP)

(72) Inventor: Yoshihiko Mori, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/979,694

(22) PCT Filed: Apr. 2, 2018

(86) PCT No.: PCT/JP2018/014106
§ 371 (c)(1),
(2) Date: Sep. 10, 2020

(87) PCT Pub. No.: WO2019/193628
PCT Pub. Date: Oct. 10, 2019

(65) Prior Publication Data
US 2021/0051201 A1   Feb. 18, 2021

(51) Int. Cl.
*H04L 67/12* (2022.01)
*H04W 4/46* (2018.01)
(Continued)

(52) U.S. Cl.
CPC .............. *H04L 67/12* (2013.01); *H04L 47/32* (2013.01); *H04L 67/01* (2022.05); *H04W 4/023* (2013.01);
(Continued)

(58) Field of Classification Search
CPC ......... H04L 47/14; H04L 47/32; H04L 67/12; H04L 67/42; H04W 4/023; H04W 4/46; H04W 84/005
See application file for complete search history.

(56) References Cited

U.S. PATENT DOCUMENTS

| | | | |
|---|---|---|---|
| 8,410,956 B2* | 4/2013 | Bai | G08G 1/161 340/905 |
| 8,775,060 B2* | 7/2014 | Solyom | G05D 1/0293 701/117 |

(Continued)

FOREIGN PATENT DOCUMENTS

| | | |
|---|---|---|
| JP | 2002-260185 A | 9/2002 |
| JP | 2005-243010 A | 9/2005 |

(Continued)

OTHER PUBLICATIONS

IEEE. "IEEE Standard for Information technology—Local and metropolitan area networks—Specific requirements—Part 11: Wireless LAN Medium Access Control (MAC) and Physical Layer (PHY) Specifications Amendment 6: Wireless Access in Vehicular Environments", IEEE Standard 802.11p—2010, 51 pages. (Year: 2010).*

(Continued)

*Primary Examiner* — George C Neurauter, Jr.
(74) *Attorney, Agent, or Firm* — Birch, Stewart, Kolasch & Birch, LLP

(57) ABSTRACT

A client device determines, whether or not transmission of unique data acquired in a host vehicle is necessary on the basis of at least one of a traveling state of the host vehicle and a surrounding environment of the host vehicle, transmits the unique data acquired in the host vehicle in a case where the unique data transmission necessity determining unit determines that the transmission is necessary, determines whether or not transmission of non-unique data acquired in (Continued)

the host vehicle is necessary on the basis of at least one of the driving state of the host vehicle and the surrounding environment of the host vehicle when the host vehicle is determined to be a representative vehicle among multiple vehicles using the unique data acquired in the multiple vehicles, and transmits the non-unique data acquired in the host vehicle when the transmission is determined to be necessary.

16 Claims, 19 Drawing Sheets

(51) Int. Cl.
    *H04W 4/02*   (2018.01)
    *H04L 67/01*  (2022.01)
    *H04W 8/04*   (2009.01)
    *H04L 47/32*  (2022.01)
    *H04W 84/00*  (2009.01)

(52) U.S. Cl.
    CPC .............. *H04W 4/46* (2018.02); *H04W 8/04* (2013.01); *H04W 84/005* (2013.01)

(56) References Cited

U.S. PATENT DOCUMENTS

| | | | | |
|---|---|---|---|---|
| 9,037,389 | B2* | 5/2015 | You | G08G 1/22 |
| | | | | 701/117 |
| 9,494,944 | B2* | 11/2016 | Alam | G08G 1/16 |
| 9,495,870 | B2* | 11/2016 | Jana | G08G 1/096716 |
| 9,632,507 | B1* | 4/2017 | Korn | G05D 1/0295 |
| 9,792,822 | B2* | 10/2017 | Hiroma | G08G 1/163 |
| 9,940,840 | B1* | 4/2018 | Schubert | B60F 1/00 |
| 10,089,882 | B2* | 10/2018 | Pandy | B60W 30/16 |
| 10,204,519 | B2* | 2/2019 | Uysal | H04B 10/1125 |
| 10,353,387 | B2* | 7/2019 | Stenneth | G05D 1/0297 |
| 10,482,767 | B2* | 11/2019 | Miller, Jr. | B60W 30/00 |
| 11,091,160 | B2* | 8/2021 | Wigard | G08G 1/096725 |
| 11,113,960 | B2* | 9/2021 | Felip Leon | G08G 1/0145 |
| 2003/0182183 | A1* | 9/2003 | Pribe | G08G 1/22 |
| | | | | 705/13 |
| 2005/0171683 | A1 | 8/2005 | Irie et al. | |
| 2010/0256852 | A1* | 10/2010 | Mudalige | G08G 1/22 |
| | | | | 701/24 |
| 2014/0139354 | A1 | 5/2014 | Miyazaki | |
| 2015/0154872 | A1 | 6/2015 | Schäfer et al. | |
| 2016/0080279 | A1* | 3/2016 | Tan | H04W 40/20 |
| | | | | 370/328 |
| 2017/0293296 | A1* | 10/2017 | Stenneth | G06Q 20/10 |
| 2020/0053706 | A1* | 2/2020 | Sadeghi | H04W 72/0486 |

FOREIGN PATENT DOCUMENTS

| | | | | |
|---|---|---|---|---|
| JP | | 2007148615 A | * | 6/2007 |
| JP | | 2007-310790 A | | 11/2007 |
| JP | | 2008-27011 A | | 2/2008 |
| JP | | 2009-129190 A | | 6/2009 |
| JP | | 2009-217371 A | | 9/2009 |
| JP | | 2010087733 A | * | 4/2010 |
| JP | | 2012-133726 A | | 7/2012 |
| JP | | 2015-106416 A | | 6/2015 |
| JP | | 2017-21584 A | | 1/2017 |
| WO | WO 2013/008806 A1 | | | 1/2013 |

OTHER PUBLICATIONS

Antonios Skordylis and Niki Trigoni. "Delay-bounded Routing in Vehicular Ad-hoc Networks", MobiHoc'08, May 26-30, 2008, Hong Kong SAR, China, 10 pages. (Year: 2008).*

Yu-Tian Tseng et al. "A Vehicle-density-based Forwarding Scheme for Emergency Message Broadcasts in VANETs", National Science Council, Taiwan, Republic of China, under grant NSC 97-2221-E-009-048-MY3 and NSC 97-2221-E-009-049-MY3, published by IEEE, 6 pages. (Year: 2010).*

Mohammed Elbes et al. "A New Hierarchical and Adaptive Protocol for Minimum-Delay V2V Communication", IEEE "GLOBECOM" 2009, 6 pages. (Year: 2009).*

Dr. Radoven Muicic. "2017 Summer Professional Development Course: Advanced Automotive Technology", Topic 2: Cooperative Connected Vehicles, Wayne State University, Jul. 2017, 78 pages., (Year: 2017).*

Ozan K, Tonguz et al. "DV-CAST: A Distributed Vehicular Broadcast Protocol for Vehicular Ad Hoc Networks", IEEE Wireless Communications, Apr. 2010, 11 pages. (Year: 2010).*

Japanese Office Action for corresponding Japanese Application No. 2020-512116, dated May 25, 2021, with English translation.

International Search Report (PCT/ISA/210) issued in PCT/JP2018/014106, dated Jul. 3, 2018.

Chinese Office Action for Chinese Application No. 201880091838.2 with English translation, dated Feb. 8, 2022.

Japanese Office Action for Japanese Application No. 2020-512116, dated Dec. 14, 2021, with English translation.

* cited by examiner

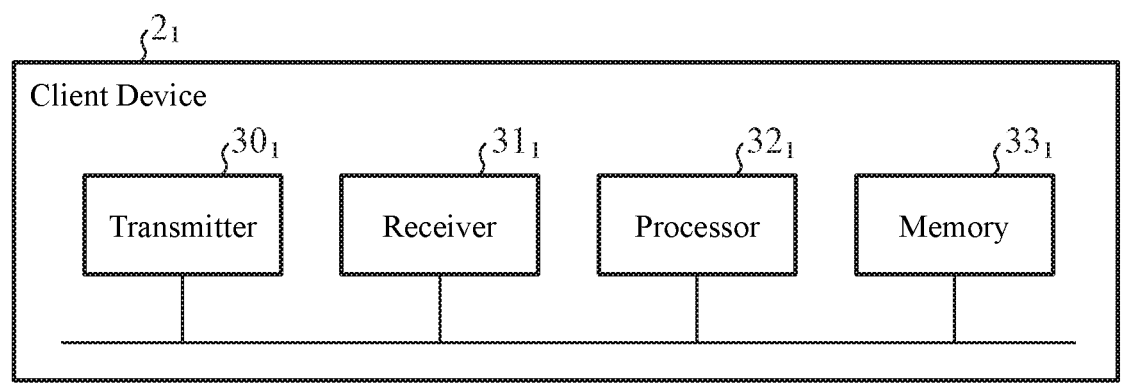

DATA COLLECTION SYSTEM FOR COLLECTING MULTIPLE TYPES OF DATA ACQUIRED BY MULTIPLE VEHICLES AND METHOD OF DATA COLLECTION

TECHNICAL FIELD

The present invention relates to a client device, a data transmission method, and a data collection system.

BACKGROUND ART

In the related art, data collection systems for collecting multiple types of data acquired by multiple vehicles have been developed. That is, multiple client devices are installed in each of multiple vehicles. Each of the multiple client devices can freely communicate with a server device. Each of the multiple client devices transmits multiple types of data, which are acquired in a corresponding vehicle among the multiple vehicles, to the server device (for example, see Patent Literature 1).

CITATION LIST

Patent Literature

Patent Literature 1: JP 2015-106416 A

SUMMARY OF INVENTION

Technical Problem

In recent years, technology development of so-called "connected cars" has been underway. With this, the number of types of data to be collected by a data collection system is increasing. As a result, the total amount of data transmitted and received in a data collection system is increasing.

The present invention has been devised in order to solve the above problem, and an object of the invention is to reduce the total amount of data transmitted and received in a data collection system for collecting multiple types of data acquired in multiple vehicles.

Solution to Problem

A client device of the present invention is for a data collection system for collecting multiple types of data including unique data and non-unique data acquired in multiple vehicles including a host vehicle and another vehicle, the client device including: a unique data transmission necessity determining unit for determining whether or not transmission of the unique data acquired in the host vehicle is necessary on the basis of at least one of a traveling state of the host vehicle or a surrounding environment of the host vehicle; a unique data transmitting unit for transmitting the unique data acquired in the host vehicle in a case where the unique data transmission necessity determining unit determines that the transmission is necessary; a non-unique data transmission necessity determining unit for determining whether or not transmission of the non-unique data acquired in the host vehicle is necessary on the basis of at least one of the driving state of the host vehicle or the surrounding environment of the host vehicle in a case where it is determined that the host vehicle is a representative vehicle among the multiple vehicles using the unique data acquired in the multiple vehicles; and a non-unique data transmitting unit for transmitting the non-unique data acquired in the host vehicle in a case where the non-unique data transmission necessity determining unit determines that the transmission is necessary.

Advantageous Effects of Invention

According to the present invention, since it is configured as described above, the total amount of data transmitted and received can be reduced in the data collection system for collecting multiple types of data acquired in multiple vehicles.

BRIEF DESCRIPTION OF DRAWINGS

FIG. 3A is a block diagram illustrating a hardware configuration of a client device included in the data collection system according to the first embodiment. FIG. 3B is a block diagram illustrating another hardware configuration of the client device included in the data collection system according to the first embodiment.

DESCRIPTION OF EMBODIMENTS

To describe the present invention further in detail, embodiments for carrying out the present invention will be described below with reference to the accompanying drawings.

First Embodiment

Figure 1:
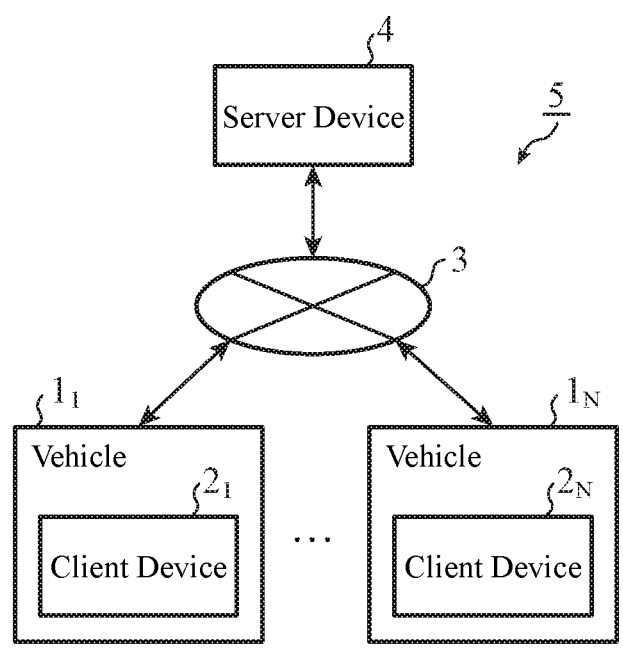
FIG. 1 is a block diagram illustrating a system configuration of a data collection system according to a first embodiment.

FIG. 1 is a block diagram illustrating a system configuration of a data collection system according to a first embodiment. A data collection system 5 according to the first embodiment will be described with reference to FIG. 1.

As illustrated in FIG. 1, each of multiple client devices 2 is installed in one of multiple vehicles 1. More specifically, N client devices $2_1$ to $2_N$ are installed in N vehicles $1_1$ to $1_N$, respectively (N is an integer of 2 or more). Each of the client devices 2 can freely communicate with the other client devices 2 using a wide area communication network 3. Each of the client devices 2 can freely communicate with a server device 4 using the wide area communication network 3. The wide area communication network 3 is implemented by, for example, a so-called "WAN" or the Internet. The client devices 2 and the server device 4 compose the data collection system 5.

The data collection system 5 collects multiple types of data (hereinafter, referred to as "collection target data") acquired in the multiple vehicles 1. Specifically, collection target data includes, for example, data indicating the traveling speed of each of the vehicles 1, data indicating the position of each of the vehicles 1, data indicating the steering angle of each of the vehicles 1, data indicating the vibration state of each of the vehicles 1, data indicating the model of each of the vehicles 1, data indicating the remaining amount of fuel in each of the vehicles 1, data indicating the communication amount of each of the vehicles 1, data indicating the condition of the road on which each of the vehicles 1 is traveling, data indicating the density of vehicles in the surrounding area of each of the vehicles 1, and data indicating the state of occurrence of traffic jams in the surrounding area of each of the vehicles 1. Each piece of collection target data is classified into either unique data or non-unique data.

Unique data is, generally, data unique to each of the vehicles 1 among the collection target data. For example, data such as data indicating the traveling speed of each of the vehicles 1, data indicating the position of each of the vehicles 1, data indicating the steering angle of each of the vehicles 1, data indicating the vibration state of each of the vehicles 1, data indicating the model of each of the vehicles 1, data indicating the remaining amount of fuel in each of the vehicles 1, and data indicating the communication amount of each of the vehicles 1 is classified as unique data. That is, there are multiple types of unique data.

Non-unique data is, generally, data other than unique data among the collection target data. For example, data such as data indicating the condition of the road on which each of the vehicles 1 is traveling, data indicating the density of vehicles in the surrounding area of each of the vehicles 1, and data indicating the state of traffic jams in the surrounding area of each of the vehicles 1 is classified as non-unique data. That is, there are multiple types of non-unique data.

Hereinafter, for each of the client devices 2, a vehicle 1 installed with the client device 2 may be referred to as the "host vehicle" or the "corresponding vehicle", and other vehicles 1 may be referred to as "other vehicles". That is, hereinafter, for each of the client devices 2, a vehicle 1 installed with the client device 2 may be described as the "host vehicle" or the "corresponding vehicle", and other vehicles 1 may be described as "other vehicles".

Figure 2:
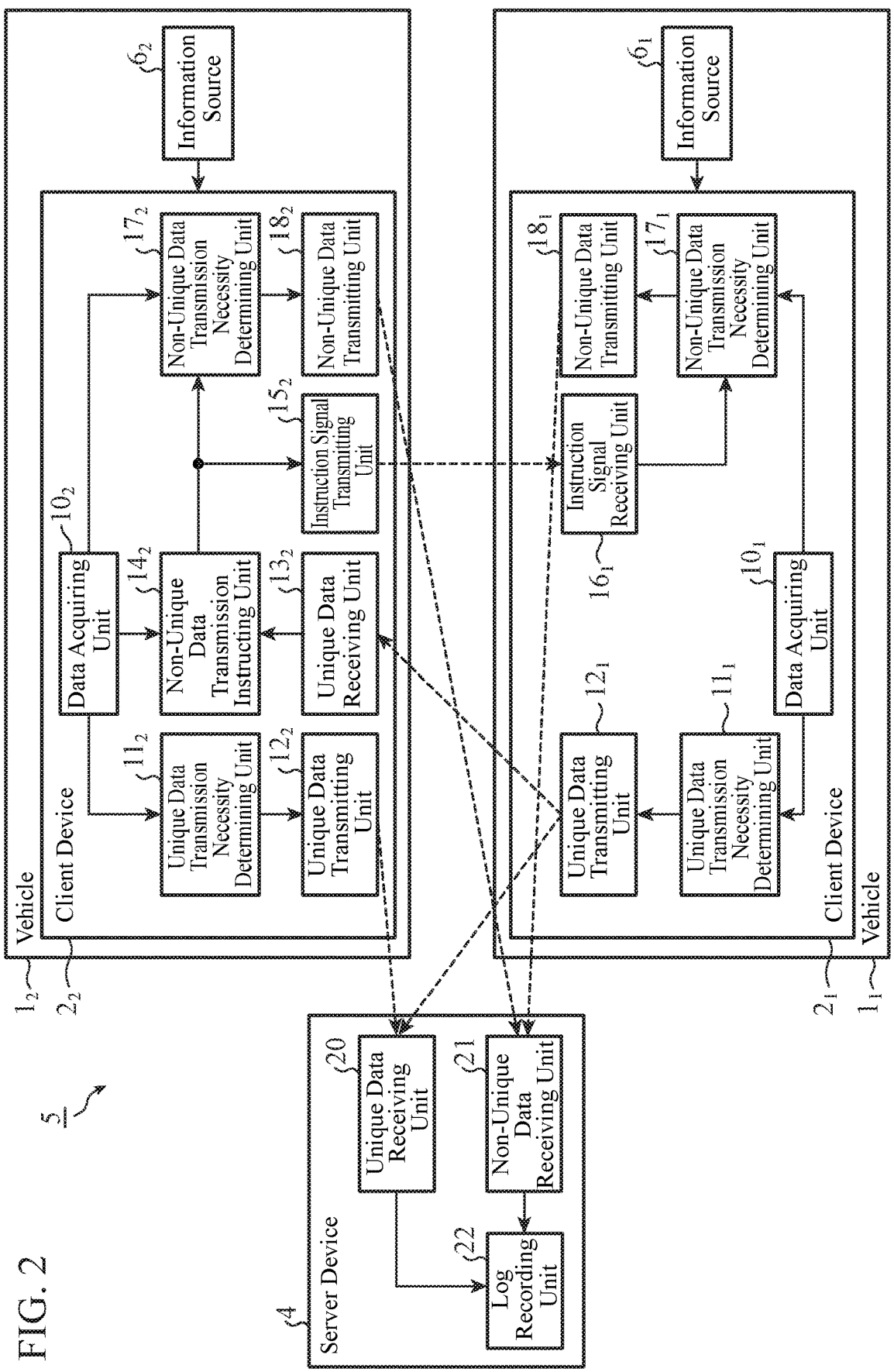
FIG. 2 is a block diagram illustrating main parts of client devices and a server device included in the data collection system according to the first embodiment.

FIG. 2 is a block diagram illustrating main parts of client devices and the server device included in the data collection system according to the first embodiment. With reference to FIG. 2, a client device 2 and the server device 4 included in the data collection system 5 according to the first embodiment will be described focusing on the example where N=2. Note that a dashed arrow in FIG. 2 corresponds to data or a signal transmitted and received using the wide area communication network 3.

A data acquiring unit $10_1$ acquires collection target data in the vehicle $1_1$ from an information source $6_1$ installed in the vehicle $1_1$. The information source $6_1$ is, for example, a car navigation system, a Global Navigation Satellite System (GNSS) receiver, a wheel speed sensor, an acceleration sensor, a gyro sensor, a steering sensor, an ultrasonic sensor, a millimeter wave radar, light detection and ranging (LiDER), a camera for imaging the outside of the vehicle, a camera for imaging the inside of the vehicle, a fuel gauge, a communication amount counter, etc.

Specifically, the data acquiring unit $10_1$ acquires data such as data indicating the traveling speed of the vehicle $1_1$, data indicating the position of the vehicle $1_1$, data indicating the steering angle of the vehicle $1_1$, data indicating the vibration state of the vehicle $1_1$, data indicating the model of the vehicle $1_1$, data indicating the remaining amount of fuel in the vehicle $1_1$, data indicating the communication amount of the vehicle $1_1$, data indicating the condition of the road on which the vehicle $1_1$ is traveling, data indicating the density of vehicles in the surrounding area of the vehicle $1_1$, and data indicating the state of occurrence of traffic jams in the surrounding area of the vehicle $1_1$.

Data indicating the traveling speed of the vehicle $1_1$ is acquired from, for example, the wheel speed sensor or the like in the information source $6_1$. Data indicating the position of the vehicle $1_1$ is acquired from, for example, the GNSS receiver in the information source $6_1$. Data indicating the steering angle of the vehicle $1_1$ is acquired from, for example, the steering sensor or the like in the information source $6_1$. Data indicating the vibration state of the vehicle $1_1$ is acquired from, for example, the acceleration sensor or the like in the information source $6_1$. Data indicating the model of the vehicle $1_1$ is acquired from, for example, the car navigation system or the like in the information source $6_1$. Data indicating the remaining amount of fuel in the vehicle $1_1$ is acquired from, for example, the fuel gauge in the information source $6_1$. Data indicating the condition of the road on which the vehicle $1_1$ is traveling, data indicating the density of vehicles in the surrounding area of the vehicle $1_1$, and data indicating the state of occurrence of traffic jams in the surrounding area of the vehicle $1_1$ are acquired from, for example, the ultrasonic sensor, the millimeter wave radar, the LiDER, the camera for imaging the outside the vehicle, or the like in the information source $6_1$.

Each piece of the collection target data acquired by the data acquiring unit $10_1$ is classified into either unique data or non-unique data. Specifically, for example, data such as data indicating the traveling speed of the vehicle $1_1$, data indicating the position of the vehicle $1_1$, data indicating the steering angle of the vehicle $1_1$, data indicating the vibration state of the vehicle $1_1$, data indicating the model of the vehicle $1_1$, data indicating the remaining amount of fuel in the vehicle $1_1$, and data indicating the communication amount of the vehicle $1_1$ are classified as unique data. Furthermore, for example, data such as data indicating the condition of the road on which the vehicle $1_1$ is traveling, data indicating the density of vehicles in the surrounding area of the vehicle $1_1$, and data indicating the state of occurrence of traffic jams in the surrounding area of the vehicle $1_1$ are classified as non-unique data.

A unique data transmission necessity determining unit $11_1$ acquires information indicating the traveling state of the vehicle $1_1$ (hereinafter referred to as "traveling state information") from the information source $6_1$, and further acquires information indicating the surrounding environment of the vehicle $1_1$ (hereinafter referred to as "surrounding environment information") from the information source $6_1$ and the wide area communication network 3. The unique data transmission necessity determining unit $11_1$ determines whether or not transmission of the unique data acquired by the data acquiring unit $10_1$ is necessary using these pieces of information on the basis of at least one of the traveling state of the vehicle $1_1$ or the surrounding environment of the vehicle $1_1$.

The unique data transmission necessity determining unit $11_1$ is set in advance with a condition for transmission of unique data, which is a condition relating to at least one of the traveling state of the vehicle $1_1$ or the surrounding environment of the vehicle $1_1$ (hereinafter, referred to as "unique data transmission condition"). The unique data transmission necessity determining unit $11_1$ determines whether or not the unique data transmission condition is satisfied using the traveling state information and the surrounding environment information. In a case where the unique data transmission condition is satisfied, the unique data transmission necessity determining unit $11_1$ determines that unique data needs to be transmitted. On the other hand, in a case where the unique data transmission condition is not satisfied, the unique data transmission necessity determining unit $11_1$ determines that unique data does not need to be transmitted.

Traveling state information indicates, for example, the traveling speed of the vehicle $1_1$, the position of the vehicle $1_1$, the vibration state of the vehicle $1_1$, the remaining amount of fuel of the vehicle $1_1$, and the like. That is, the contents of traveling state information and the contents of unique data can overlap each other.

Information indicating the traveling speed of the vehicle $1_1$ is acquired from, for example, the wheel speed sensor or the like in the information source $6_1$. Information indicating the position of the vehicle $1_1$ is acquired from, for example, the GNSS receiver in the information source $6_1$. Information indicating the vibration state of the vehicle $1_1$ is acquired from, for example, the acceleration sensor or the like in the information source $6_1$. Information indicating the remaining amount of fuel in the vehicle $1_1$ is acquired from, for example, the fuel gauge in the information source $6_1$.

Surrounding environment information indicates, for example, the type of road on which the vehicle $1_1$ is traveling (national road, prefectural road, etc.), the shape of the road on which the vehicle $1_1$ is traveling (straight, curve, etc.), the condition of the road on which the vehicle $1_1$ is traveling (material, unevenness, or curvature of the road, quality of white line, etc.), the distance between the vehicle $1_1$ and another vehicle traveling in the surrounding area of the vehicle $1_1$ (hereinafter, referred to as a "surrounding vehicle"), the weather in the surrounding area of the vehicle $1_1$, and the like. That is, the contents of surrounding environment information and the contents of non-unique data can overlap.

Information indicating the type of the road on which the vehicle $1_1$ is traveling is acquired from, for example, the car navigation system or the like in the information source $6_1$. Information indicating the shape of the road on which the vehicle $1_1$ is traveling, information indicating the state of the road on which the vehicle $1_1$ is traveling, and information indicating the distance between the vehicle $1_1$ and a surrounding vehicle are acquired from, for example, the ultrasonic sensor, the millimeter wave radar, the LiDER, the camera for imaging the outside of the vehicle, or the like in the information source $6_1$. Information indicating the weather in the surrounding area of the vehicle $1_1$ is obtained from, for example, the wide area communication network 3 (more specifically, the Internet).

A unique data transmitting unit $12_1$ transmits the unique data acquired by the data acquiring unit $10_1$ to a client device $2_2$ and the server device 4 in a case where the unique data transmission necessity determining unit $11_1$ determines that the transmission is necessary.

A data acquiring unit $10_2$ acquires collection target data in a vehicle $1_2$ from an information source $6_2$ installed in the vehicle $1_2$. Since specific examples of the information source $6_2$ are similar to the specific examples of the information source $6_1$, detailed description will be omitted. Since specific examples of the collection target data acquired by the data acquiring unit $10_2$ are similar to the specific examples of the collection target data acquired by the data acquiring unit $10_1$, detailed description will be omitted.

A unique data transmission necessity determining unit $11_2$ acquires information indicating the traveling state of the vehicle $1_2$ (that is, traveling state information) from the information source $6_2$, and further acquires information indicating the surrounding environment of the vehicle $1_2$ (that is, surrounding environment information) from the information source $6_2$ and the wide area communication network 3. The unique data transmission necessity determining unit $11_2$ determines whether or not transmission of the unique data acquired by the data acquiring unit $10_2$ is necessary using these pieces of information on the basis of at least one of the traveling state of the vehicle $1_2$ or the surrounding environment of the vehicle $1_2$.

Since the method of determining the necessity of transmission by the unique data transmission necessity determining unit $11_2$ is similar to the method of determining the necessity of transmission by the unique data transmission necessity determining unit $11_1$, detailed description will be omitted. Since specific examples of the traveling state information of the vehicle $1_2$ are similar to the specific examples of the traveling state information of the vehicle $1_1$, detailed description will be omitted. Since specific examples of the surrounding environment information of the vehicle $1_2$ are similar to the specific examples of the surrounding environment information of the vehicle detailed description will be omitted.

A unique data transmitting unit $12_2$ transmits the unique data acquired by the data acquiring unit $10_2$ to the server device 4 in a case where the unique data transmission necessity determining unit $11_2$ determines that the transmission is necessary.

A unique data receiving unit $13_2$ receives the unique data transmitted by the unique data transmitting unit $12_1$.

A non-unique data transmission instructing unit $14_2$ determines one or more vehicles that transmit non-unique data among the multiple vehicles $1_1$ and $1_2$ (hereinafter referred to as the "representative vehicles") using the unique data acquired by the data acquiring unit $10_2$ (that is, the unique data acquired by the vehicle $1_2$) and the unique data received by the unique data receiving unit $13_2$ (that is, the unique data acquired in the vehicle $1_1$).

That is, rules for determining a representative vehicle (hereinafter, referred to as "representative vehicle determining rules") are set in advance in the non-unique data transmission instructing unit $14_2$. The non-unique data transmission instructing unit $14_2$ determines a representative vehicle in accordance with the representative vehicle determining rules.

Specifically, for example, the non-unique data transmission instructing unit $14_2$ selects, from the multiple vehicles $1_1$ and $1_2$, one or more vehicles whose traveling speed is less than a predetermined speed, remaining amount of fuel is equal to or more than a predetermined amount, and communication amount within a preceding predetermined period of time is less than a predetermined amount. The non-unique data transmission instructing unit $14_2$ calculates, for each of the selected one or more vehicles, a value that is inversely proportional to the communication amount within the preceding predetermined period of time (hereinafter, referred to as an "evaluation value"). The non-unique data transmission instructing unit $14_2$ determines that the vehicle whose calculated evaluation value exceeds a predetermined threshold value is the representative vehicle among the selected one or more vehicles.

The non-unique data transmission instructing unit $14_2$ outputs a signal indicating the result of the determination, that is, a signal indicating the representative vehicle among the multiple vehicles $1_1$ and $1_2$. Hereinafter, the signal output by the non-unique data transmission instructing unit $14_2$ is referred to as a "non-unique data transmission instruction signal" or an "instruction signal".

An instruction signal transmitting unit $15_2$ transmits the instruction signal output by the non-unique data transmission instructing unit $14_2$ to the client device $2_1$. An instruction signal receiving unit $16_1$ receives the instruction signal transmitted by the instruction signal transmitting unit $15_2$.

A non-unique data transmission necessity determining unit $17_1$ determines whether or not the vehicle $1_1$ is a representative vehicle using the instruction signal received by the instruction signal receiving unit $16_1$. In a case where the vehicle $1_1$ is a representative vehicle, the non-unique data transmission necessity determining unit $17_1$ acquires the traveling state information of the vehicle $1_1$ from the information source $6_1$, and acquires the surrounding environment information of the vehicle $1_1$ from the information source $6_1$ and the wide area communication network 3. The non-unique data transmission necessity determining unit $17_1$ determines whether or not transmission of the non-unique data acquired by the data acquiring unit $10_1$ is necessary using these pieces of information on the basis of at least one of the traveling state of the vehicle or the surrounding environment of the vehicle $1_1$.

That is, a condition similar to the unique data transmission condition in the unique data transmission necessity determining unit $11_1$ (hereinafter referred to as "non-unique data transmission condition") is set in advance in the non-unique data transmission necessity determining unit $17_1$. The non-unique data transmission necessity determining unit $17_1$ determines whether or not the non-unique data transmission condition is satisfied using the traveling state information and the surrounding environment information. In a case where the non-unique data transmission condition is satisfied, the non-unique data transmission necessity determining unit $17_1$ determines that transmission of non-unique data is necessary. On the other hand, in a case where the non-unique data transmission condition is not satisfied, the non-unique data transmission necessity determining unit $17_1$ determines that transmission of the non-unique data is not necessary.

A non-unique data transmitting unit $18_1$ transmits non-unique data acquired by the data acquiring unit $10_1$ to the server device 4 in a case where the non-unique data transmission necessity determining unit $17_1$ determines that the transmission is necessary.

A non-unique data transmission necessity determining unit $17_2$ determines whether or not the vehicle $1_2$ is a representative vehicle using the instruction signal output by the non-unique data transmission instructing unit $14_2$. In a case where the vehicle $1_2$ is a representative vehicle, the non-unique data transmission necessity determining unit $17_2$ acquires the traveling state information of the vehicle $1_2$ from the information source $6_1$, and acquires the surrounding environment information of the vehicle $1_2$ from the information source $6_2$ and the wide area communication network 3. The non-unique data transmission necessity determining unit $17_2$ determines whether or not transmission of the non-unique data acquired by the data acquiring unit $10_2$ is necessary using these pieces of information on the basis of at least one of the traveling state of the vehicle $1_2$ or the surrounding environment of the vehicle $1_2$.

Since the method of determining the necessity of transmission by the non-unique data transmission necessity determining unit $17_2$ is similar to the method of determining the necessity of transmission by the non-unique data transmission necessity determining unit $17_1$, detailed description will be omitted.

A non-unique data transmitting unit $18_2$ transmits non-unique data acquired by the data acquiring unit $10_2$ to the server device 4 in a case where the non-unique data transmission necessity determining unit $17_2$ determines that the transmission is necessary.

A unique data receiving unit 20 receives the unique data transmitted by the unique data transmitting units $12_1$ and $12_2$. A non-unique data receiving unit 21 receives non-unique data transmitted by the non-unique data transmitting units $18_1$ and $18_2$.

A log recording unit 22 records logs of the unique data received by the unique data receiving unit 20 and the non-unique data received by the non-unique data receiving unit 21. That is, the log recording unit 22 records logs of multiple types of data collected by the data collection system 5. The logs recorded in the log recording unit 22 are used for various analyses.

The client device $2_1$ includes the data acquiring unit $10_1$, the unique data transmission necessity determining unit $11_1$, the unique data transmitting unit $12_1$, the instruction signal receiving unit $16_1$, the non-unique data transmission necessity determining unit $17_1$, and the non-unique data transmitting unit $18_1$. The client device $2_2$ includes the data acquiring unit $10_2$, the unique data transmission necessity determining unit $11_2$, the unique data transmitting unit $12_2$, the unique data receiving unit $13_2$, the non-unique data transmission instructing unit $14_2$, the instruction signal transmitting unit $15_2$, the non-unique data transmission necessity determining unit $17_2$, and the non-unique data transmitting unit $18_2$. The server device 4 includes the unique data receiving unit 20, the non-unique data receiving unit 21, and the log recording unit 22.

Next, a hardware configuration of the client device $2_1$ for the data collection system 5 will be described with reference to FIG. 3.

As illustrated in FIG. 3A, the client device $2_1$ includes a transmitter $30_1$, a receiver $31_1$, a processor $32_1$, and a memory $33_1$. The functions of the unique data transmitting unit $12_1$ and the non-unique data transmitting unit $18_1$ are implemented by the transmitter $30_1$. The function of the instruction signal receiving unit $16_1$ is implemented by the receiver $31_1$. The memory $33_1$ stores programs for implementing the functions of the data acquiring unit $10_1$, the unique data transmission necessity determining unit $11_1$, and the non-unique data transmission necessity determining unit $17_1$. The functions of the data acquiring unit $10_1$, the unique data transmission necessity determining unit $11_1$, and the non-unique data transmission necessity determining unit $17_1$ are implemented by the processor $32_1$ reading and executing the programs stored in the memory $33_1$.

Alternatively, as illustrated in FIG. 3B, the client device $2_1$ may include the transmitter $30_1$, the receiver $31_1$ and a processing circuit $34_1$. In this case, the functions of the data acquiring unit $10_1$, the unique data transmission necessity determining unit $11_1$, and the non-unique data transmission necessity determining unit $17_1$ may be implemented by the processing circuit $34_1$.

Alternatively, the client device $2_1$ may include the transmitter $30_1$, the receiver $31_1$, the processor $32_1$, the memory $33_1$, and the processing circuit $34_1$. In this case, some of the functions of the data acquiring unit $10_1$, the unique data transmission necessity determining unit $11_1$, and the non-unique data transmission necessity determining unit $17_1$ may be implemented by the processor $32_1$ and the memory $33_1$, and the remaining functions may be implemented by the processing circuit $34_1$.

The processor $32_1$ is implemented by, for example, a central processing unit (CPU), a graphics processing unit (GPU), a microprocessor, a micro controller, a digital signal processor (DSP), or the like.

The memory $33_1$ is implemented by, for example, a semiconductor memory, a magnetic disk, an optical disk, a magneto-optical disk, or the like. More specifically, the memory $33_1$ may be implemented by a random access memory (RAM), a read only memory (ROM), a flash memory, an erasable programmable read only memory (EPROM), an electrically erasable programmable read-only memory (EEPROM), a solid state drive (SSD), a hard disk drive (HDD), a floppy disk (FD), a compact disc (CD), a digital versatile disc (DVD), a magneto-optical (MO), a mini disc (MD), or the like.

The processing circuit $34_1$ may be implemented by, for example, an application specific integrated circuit (ASIC), a programmable logic device (PLD), a field-programmable gate array (FPGA), a system-on-a-chip (SoC), or a system large-scale integration (LSI).

Next, a hardware configuration of the client device $2_2$ for the data collection system 5 will be described with reference to FIG. 4.

Figure 4A:
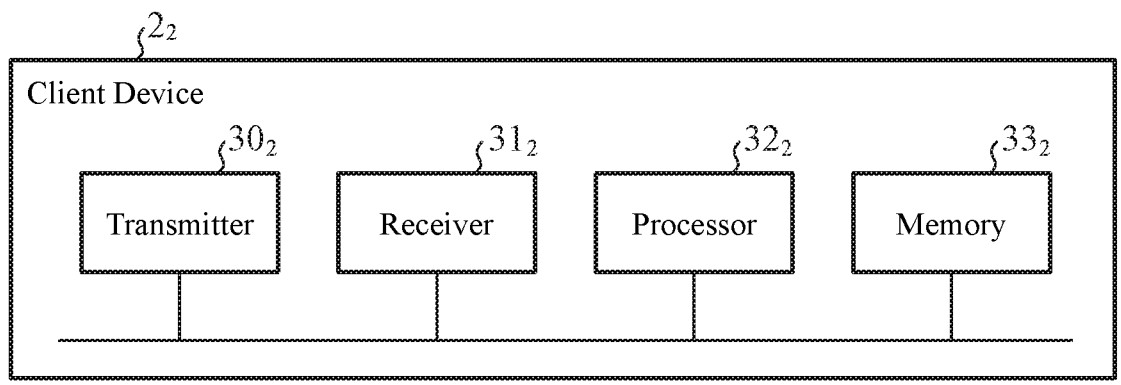
FIG. 4A is a block diagram illustrating a hardware configuration of a client device included in the data collection system according to the first embodiment.

As illustrated in FIG. 4A, the client device $2_2$ includes a transmitter $30_2$, a receiver $31_2$, a processor $32_2$, and a memory $33_2$. The functions of the unique data transmitting unit $12_2$, the instruction signal transmitting unit $15_2$, and the non-unique data transmitting unit $18_2$ are implemented by the transmitter $30_2$. The function of the unique data receiving unit $13_2$ is implemented by the receiver $31_2$. The memory $33_2$ stores programs for implementing the functions of the data acquiring unit $10_2$, the unique data transmission necessity determining unit $11_2$, the non-unique data transmission instructing unit $14_2$, and the non-unique data transmission necessity determining unit $17_2$. The functions of the data acquiring unit $10_2$, the unique data transmission necessity determining unit $11_2$, the non-unique data transmission instructing unit $14_2$, and the non-unique data transmission necessity determining unit $17_2$ are implemented by the processor $32_2$ reading and executing the programs stored in the memory $33_2$.

Figure 4B:
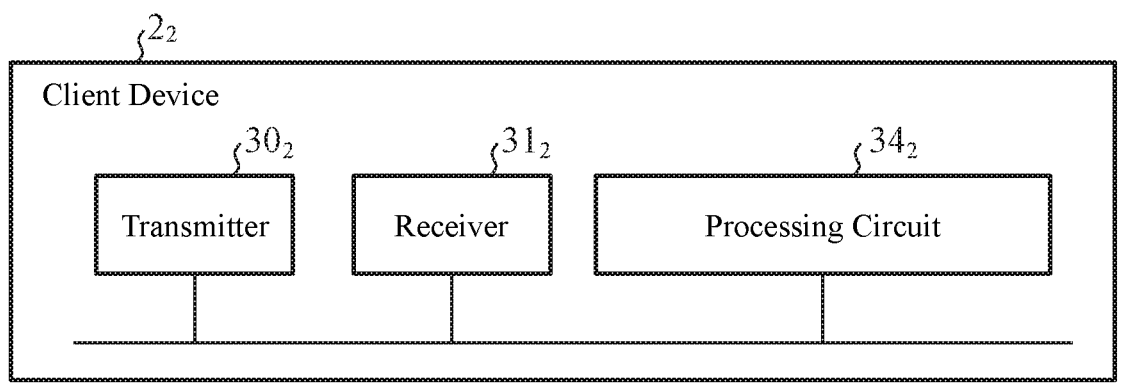
FIG. 4B is a block diagram illustrating another hardware configuration of the client device included in the data collection system according to the first embodiment.

Alternatively, as illustrated in FIG. 4B, the client device $2_2$ may include the transmitter $30_2$, the receiver $31_2$, and a processing circuit $34_2$. In this case, the functions of the data acquiring unit $10_2$, the unique data transmission necessity determining unit $11_2$, the non-unique data transmission instructing unit $14_2$, and the non-unique data transmission necessity determining unit $17_2$ may be implemented by the processing circuit $34_2$.

Alternatively, the client device $2_2$ may include the transmitter $30_2$, the receiver $31_2$, the processor $32_2$, the memory $33_2$, and the processing circuit $34_2$. In this case, some of the functions of the data acquiring unit $10_2$, the unique data transmission necessity determining unit $11_2$, the non-unique data transmission instructing unit $14_2$, and the non-unique data transmission necessity determining unit $17_2$ may be implemented by the processor $32_2$ and the memory $33_2$, and the remaining functions may be implemented by the processing circuit $34_2$.

Since specific examples of the processor $32_2$ are similar to the specific examples of the processor $32_1$, detailed description will be omitted. Since specific examples of the memory $33_2$ are similar to the specific examples of the memory $33_1$, detailed description will be omitted. Since specific examples of the processing circuit $34_2$ are similar to the specific examples of the processing circuit $34_1$, detailed description will be omitted.

Next, a hardware configuration of the server device 4 for the data collection system 5 will be described with reference to FIG. 5.

Figure 5:
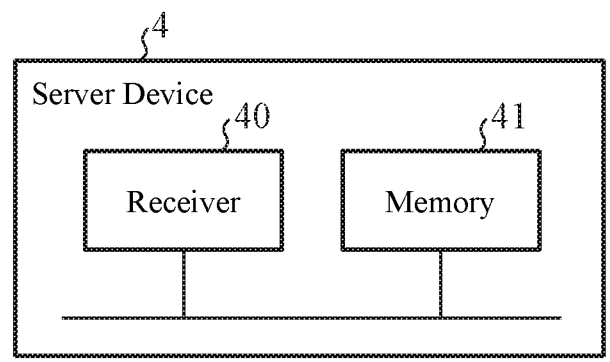
FIG. 5 is a block diagram illustrating a hardware configuration of the server device included in the data collection system according to the first embodiment.

As illustrated in FIG. 5, the server device 4 includes a receiver 40 and a memory 41. The functions of the unique data receiving unit 20 and the non-unique data receiving unit 21 are implemented by the receiver 40. The function of the log recording unit 22 is implemented by the memory 41. The memory 41 may be implemented by, for example, an HDD, an SSD, or a magnetic tape.

Next, with reference to the flowchart of FIG. 6, the operation of each of the client devices 2 will be described focusing on operations of a data acquiring unit 10, a unique data transmission necessity determining unit 11, and a unique data transmitting unit 12.

First, in step ST1, the data acquiring unit 10 acquires unique data of the host vehicle. The process of step ST1 is repeatedly executed at predetermined time intervals while the power of the client device 2 is on, for example. Alternatively, for example, the process of step ST1 is executed when a predetermined event occurs in the host vehicle while the power of the client device 2 is on.

Next, in step ST2, the unique data transmission necessity determining unit 11 acquires traveling state information of the host vehicle and surrounding environment information of the host vehicle. The unique data transmission necessity determining unit 11 determines whether or not transmission of the unique data acquired in step ST1 is necessary using these pieces of information on the basis of at least one of the traveling state of the host vehicle or the surrounding environment of the host vehicle.

If the unique data transmission necessity determining unit 11 determines that the transmission is necessary ("YES" in step ST2), the unique data transmitting unit 12 transmits the unique data acquired in step ST1 to the wide area communication network 3 in step ST3. On the other hand, if the unique data transmission necessity determining unit 11 determines that the transmission is unnecessary ("NO" in step ST2), the process of step ST3 is skipped.

Next, with reference to the flowchart of FIG. 7, the operation of each of the client devices 2 will be described focusing on operations of the data acquiring unit 10, a non-unique data transmission necessity determining unit 17, and a non-unique data transmitting unit 18. Note that it is assumed that the representative vehicle has been determined by the non-unique data transmission instructing unit 14 before the process of step ST11 is performed and that the non-unique data transmission instruction signal has been output by the non-unique data transmission instructing unit 14.

First, in step ST11, the data acquiring unit 10 acquires non-unique data in the host vehicle. The process of step ST11 is repeatedly executed at predetermined time intervals, for example, while the power of the client device 2 is on. Alternatively, for example, the process of step ST11 is executed when a predetermined event occurs in the host vehicle while the power of the client device 2 is on.

Next, in step ST12, the non-unique data transmission necessity determining unit 17 determines whether or not the host vehicle is a representative vehicle using the non-unique data transmission instruction signal. If the host vehicle is not a representative vehicle ("NO" in step ST12), the processes of step ST13 and the subsequent steps are skipped.

On the other hand, if the host vehicle is a representative vehicle ("YES" in step ST12), the non-unique data transmission necessity determining unit 17 acquires the traveling state information of the host vehicle and the surrounding environment information of the host vehicle in step ST13. The non-unique data transmission necessity determining unit 17 determines whether or not transmission of the non-unique data acquired in step ST11 is necessary using these pieces of information on the basis of at least one of the traveling state of the host vehicle or the surrounding environment of the host vehicle.

If the non-unique data transmission necessity determining unit 17 determines that the transmission is necessary ("YES" in step ST13), the non-unique data transmitting unit 18 transmits the non-unique data acquired in step ST11 using the wide area communication network 3 in step ST14. On the other hand, if the non-unique data transmission necessity determining unit 17 determines that the transmission is unnecessary ("NO" in step ST13), the process of step ST14 is skipped.

As described above, in the data collection system 5 of the first embodiment, the necessity of transmission of individual pieces of collection target data is determined, and only collection target data, transmission of which is determined to be necessary, is transmitted to the server device 4. In particular, determination of necessity of transmission of non-unique data, and transmission of the non-unique data are executed only in the representative vehicle. As a result, the total amount of data transmitted and received in the data collection system 5 can be reduced.

Note that the unique data transmission necessity determining unit 11 may determine the necessity of transmission in accordance with a unique data transmission condition that is different for each type of the unique data. As a result, data having a higher value among the unique data (e.g., data useful in analyses) can be included in the transmission target, and data having a lower value among the unique data (e.g., data unnecessary in analyses) can be excluded from the transmission target.

Specifically, for example, the unique data transmission necessity determining unit 11 may determine for data indicating the steering angle of the host vehicle that, generally, transmission is not necessary in a case where the shape of the road on which the host vehicle is traveling is straight, whereas it may be determined that transmission is exceptionally necessary when the weather in the surrounding area of the host vehicle is rainy.

In addition, the non-unique data transmission necessity determining unit 17 may determine the necessity of transmission in accordance with a non-unique data transmission condition that is different for each type of the non-unique data. As a result, data having a higher value among the non-unique data (e.g., data useful in analyses) can be included in the transmission target, and data having a lower value among the non-unique data (e.g., data unnecessary in analyses) can be excluded from the transmission target.

Moreover, the unique data transmitting unit 12 may set the transmission order of the unique data to be different to each other depending on the priority set for each type of the unique data. A priority value corresponding to each of the types may be set in advance, or may be set to a different value depending on a passenger of the host vehicle. In the latter case, the unique data transmitting unit 12 may acquire the result of the personal authentication process for the passenger of the host vehicle and set a priority value on the basis of the result of the personal authentication process. The personal authentication process may use, for example, a password or the like input to an operation input device (not illustrated) installed in the host vehicle, or an image captured by the camera for imaging the inside of the vehicle in the information source 6.

Moreover, the non-unique data transmitting unit 18 may make the transmission order of the non-unique data be different depending on the priority set for each type of the non-unique data. A priority value corresponding to each of the types may be set in advance, or may be set to a different value depending on a passenger of the host vehicle. In the latter case, the non-unique data transmitting unit 18 may acquire the result of a personal authentication process for a passenger of the host vehicle and set a priority value on the basis of the result of the personal authentication process.

Further, the representative vehicle determining rules are not limited to the above specific example. The non-unique data transmission instructing unit 14 may determine a representative vehicle in accordance with any rules as long as the unique data acquired in the multiple vehicles 1 is used.

Specifically, for example, the non-unique data transmission instructing unit 14 may select one or more vehicles that satisfy a predetermined condition from among other vehicles (i.e., surrounding vehicles) traveling in the surrounding area of the host vehicle using data indicating the position of each of the vehicles 1 and determine the selected one or more vehicles as representative vehicles.

Alternatively, for example, the non-unique data transmission instructing unit 14 may determine a representative vehicle on the basis of the traveling state of each of the vehicles 1 using data indicating the traveling state of each of the vehicles 1 (i.e., at least one of data indicating the traveling speed of each of the vehicles 1, data indicating the position of each of the vehicles 1, data indicating the vibration state of each of the vehicles 1, or data indicating the remaining amount of fuel in each of the vehicles 1).

Figure 8:
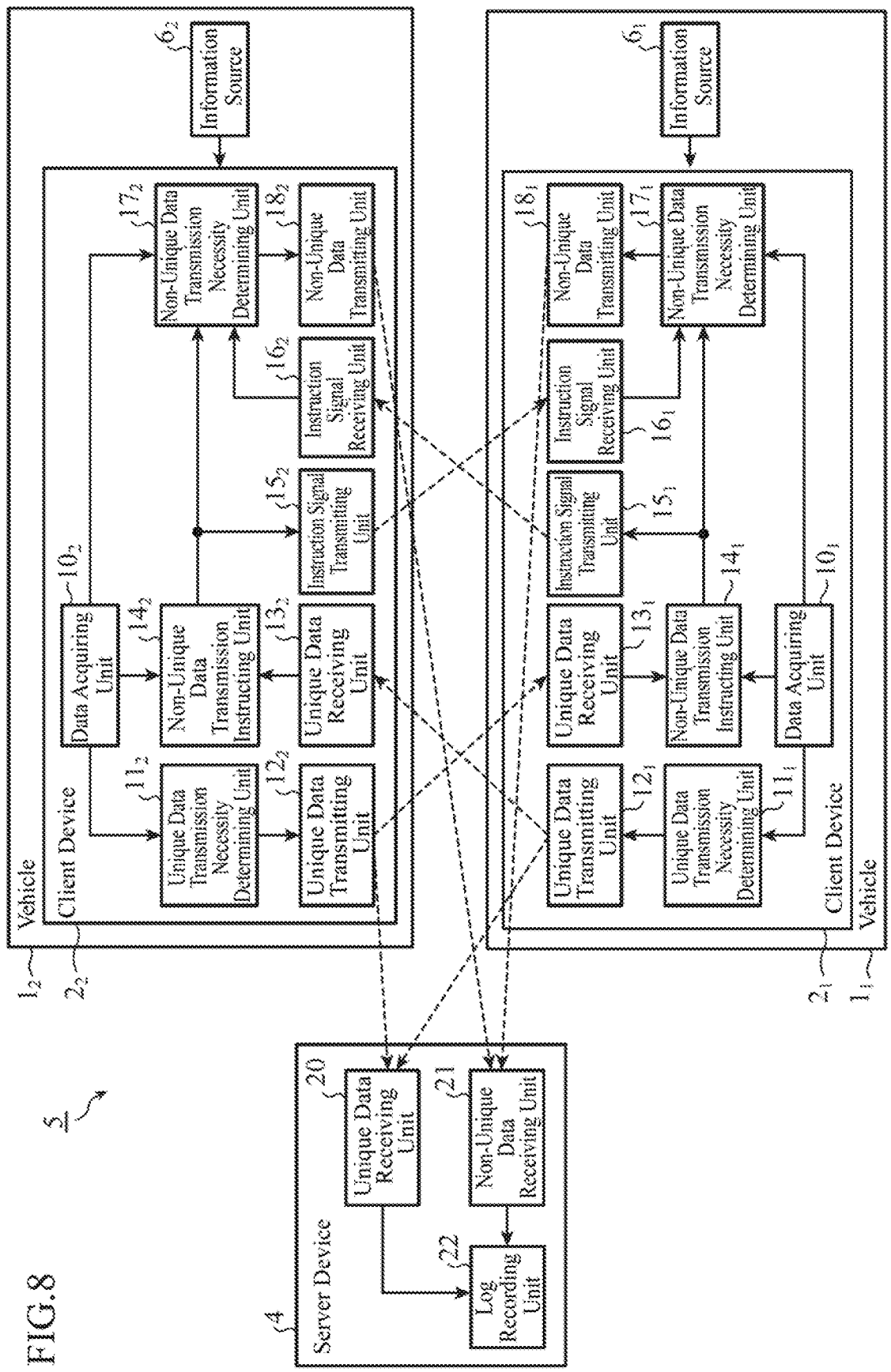
FIG. 8 is a block diagram illustrating main parts of client devices and a server device included in another data collection system according to the first embodiment.

Furthermore, the non-unique data transmission instructing unit 14 is only required to be installed in at least one of the multiple client devices 2 but may be installed in all the client devices 2. For example, as illustrated in FIG. 8, in the example of N=2, the client device $2_1$ may include a unique data receiving unit $13_1$, a non-unique data transmission instructing unit $14_1$, an instruction signal transmitting unit $15_1$, and an instruction signal receiving unit $16_1$, and the client device $2_2$ may include a unique data receiving unit $13_2$, a non-unique data transmission instructing unit $14_2$, an instruction signal transmitting unit $15_2$, and an instruction signal receiving unit $16_2$.

In a case where a non-unique data transmission instructing unit 14 is installed in each of two or more client devices 2, which of client devices 2 executes the determination of a representative vehicle (i.e., which of the vehicles 1 is the destination of unique data) may be set in advance or may be set at random.

Figure 9:
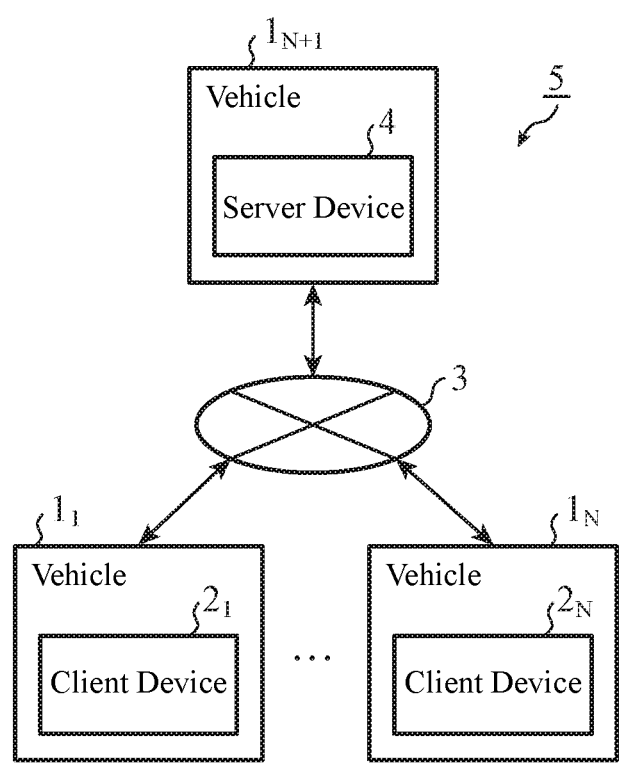
FIG. 9 is a block diagram illustrating a system configuration of another data collection system according to the first embodiment.
Figure 10:
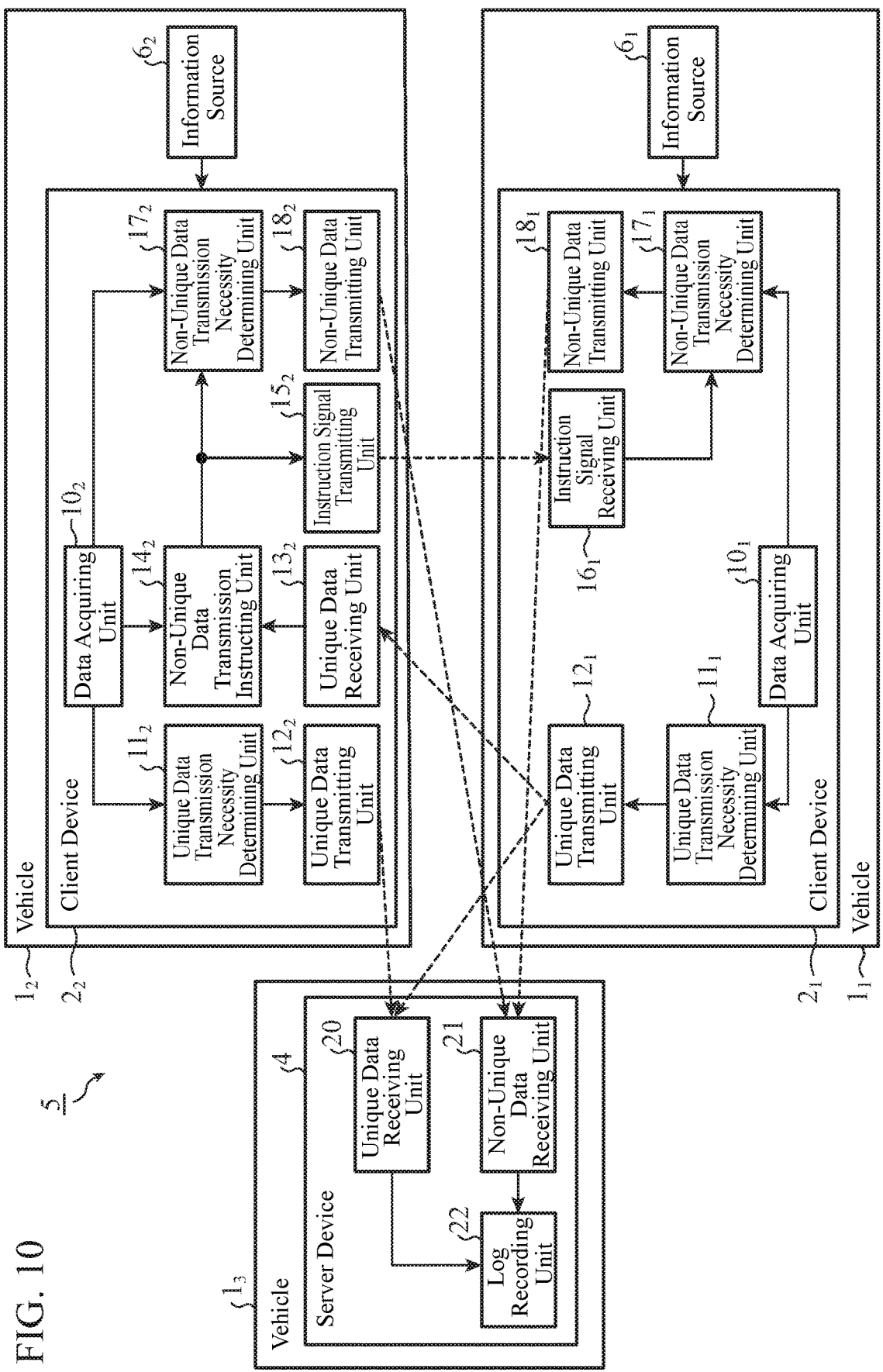
FIG. 10 is a block diagram illustrating main parts of client devices and a server device included in still another data collection system according to the first embodiment.
Figure 11:
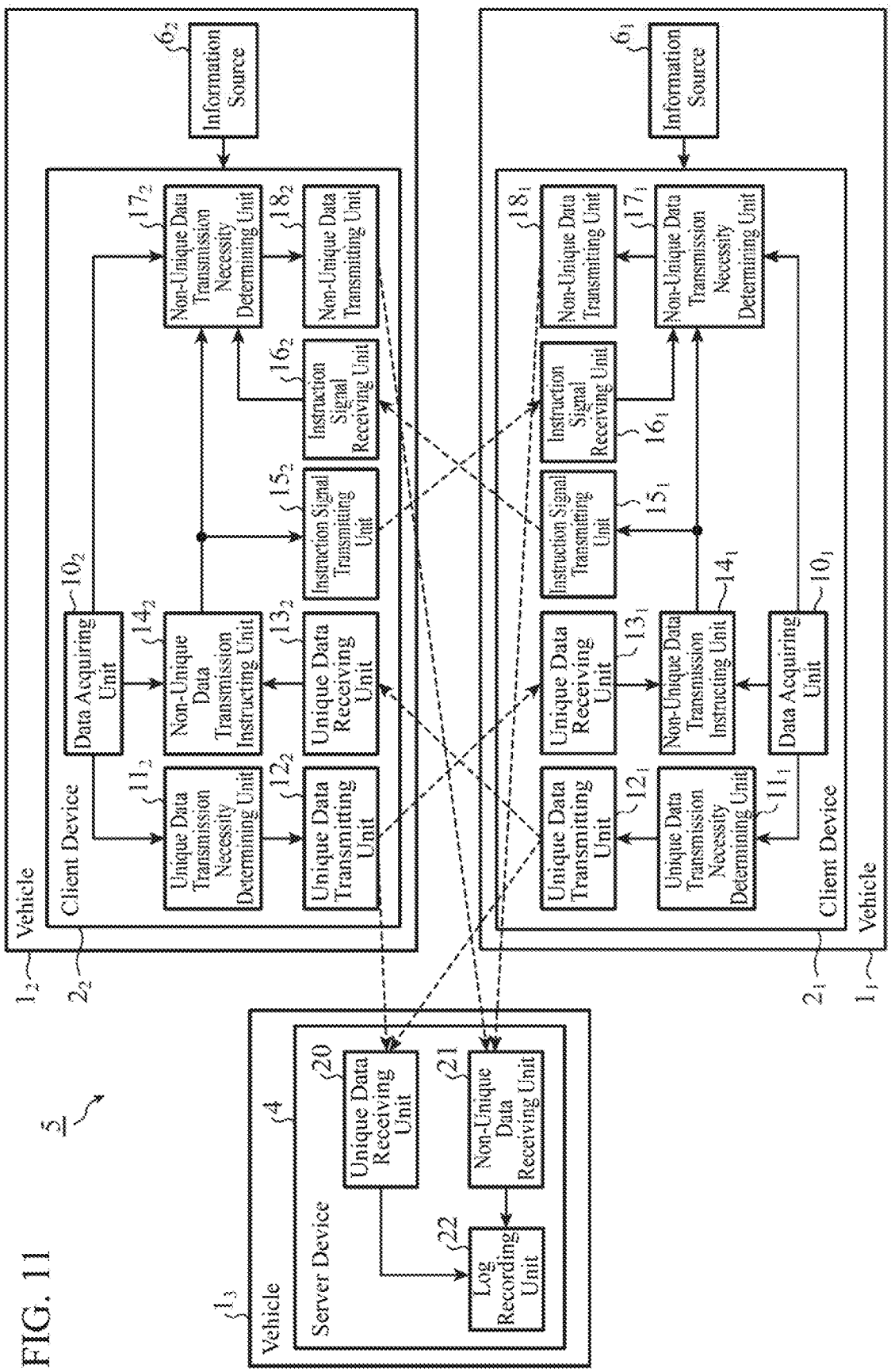
FIG. 11 is a block diagram illustrating main parts of client devices and a server device included in yet another data collection system according to the first embodiment.

Meanwhile, the server device 4 may be a device to be mounted on a vehicle. For example, as illustrated in FIG. 9, the server device 4 may be installed in a vehicle $1_{N+1}$. As illustrated in FIG. 10 or FIG. 11, in the example where N=2, the server device 4 may be installed in a vehicle $1_3$.

Figure 12:
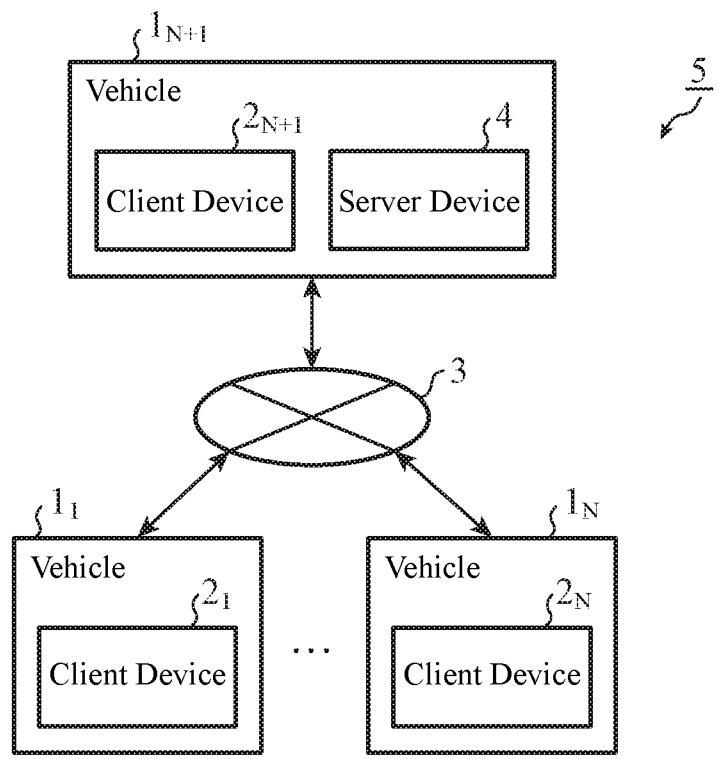
FIG. 12 is a block diagram illustrating a system configuration of another data collection system according to the first embodiment.

Furthermore, in a case where the server device 4 is a device to be mounted on a vehicle, a client device 2 may be installed in a vehicle 1 on which the server device 4 is installed. For example, as illustrated in FIG. 12, the vehicle $1_{N+1}$ may be installed with the server device 4 and the client device $2_{N+1}$. In this case, the server device 4 and the client device $2_{N+1}$ may be integrated in the vehicle $1_{N+1}$.

As described above, the client device 2 of the first embodiment is for the data collection system 5 for collecting multiple types of data including unique data and non-unique data acquired in multiple vehicles 1 including a host vehicle and other vehicles, the client device 2 including: the unique data transmission necessity determining unit 11 determining transmission necessity of whether or not transmission of the unique data acquired in the host vehicle is necessary on the basis of at least one of a traveling state of the host vehicle or a surrounding environment of the host vehicle; the unique data transmitting unit 12 transmitting the unique data acquired in the host vehicle in a case where the unique data transmission necessity determining unit 11 determines that the transmission is necessary; the non-unique data transmission necessity determining unit 17 determining transmission necessity of whether or not transmission of the non-unique data acquired in the host vehicle is necessary on the basis of at least one of the driving state of the host vehicle or the surrounding environment of the host vehicle in a case where it is determined that the host vehicle is a representative vehicle among the multiple vehicles 1 using the unique data acquired in the multiple vehicles 1; and the non-unique data transmitting unit 18 transmitting the non-unique data acquired in the host vehicle in a case where the non-unique data transmission necessity determining unit 17 determines that the transmission is necessary. As a result, the total amount of data transmitted and received in the data collection system 5 can be reduced.

In addition, the client device 2 includes the unique data receiving unit 13 receiving unique data acquired in the other vehicle; and the non-unique data transmission instructing unit 14 determining a representative vehicle among the multiple vehicles 1 using the unique data acquired in the multiple vehicles 1. This allows the client device 2 to execute determination of the representative vehicle.

The unique data transmission necessity determining unit 11 determines the transmission necessity in accordance with a condition (unique data transmission condition) that is different for each type of the unique data. As a result, data having a higher value among the unique data can be included in the transmission target, and data having a lower value among the unique data can be excluded from the transmission target.

The non-unique data transmission necessity determining unit 17 determines the transmission necessity in accordance with a condition (non-unique data transmission condition) that is different for each type of the non-unique data. As a result, data having a higher value among the non-unique data can be included in the transmission target, and data having a lower value among the non-unique data can be excluded from the transmission target.

Moreover, the unique data transmitting unit 12 makes a transmission order of the unique data be different depending on the priority set for each type of the unique data. As a result, for example, unique data can be transmitted in the descending order of priority.

Moreover, the non-unique data transmitting unit 18 makes the transmission order of the non-unique data be different depending on the priority set for each type of the non-unique data. As a result, for example, non-unique data can be transmitted in the descending order of priority.

A priority is set to a value which is different depending on a passenger of the host vehicle. As a result, the transmission order of unique data can be set for each passenger. Furthermore, the transmission order of non-unique data can be set for each passenger.

In addition, unique data indicates the position of each of the multiple vehicles 1, and the non-unique data transmission instructing unit 14 determines, as a representative vehicle, one or more of a plurality of the other vehicles traveling in the surrounding area (surrounding vehicles) of the host vehicle among the multiple vehicles 1. In this manner, a representative vehicle can be determined on the basis of the positional relationship of other vehicles with respect to the host vehicle.

Unique data indicates the traveling state of each of the multiple vehicles 1, and the non-unique data transmission instructing unit 14 determines a representative vehicle among the multiple vehicles 1 on the basis of the traveling state of each of the multiple vehicles 1. As described above, the representative vehicle can be determined on the basis of the traveling state of each of the vehicles 1.

Further, the data transmission method according to the first embodiment is a data transmission method by a client device 2 for the data collection system 5 for collecting multiple types of data including unique data and non-unique data acquired in multiple vehicles 1 including the host vehicle and another vehicle, and the data transmission method includes: step ST2 of determining, by the unique data transmission necessity determining unit 11, transmission necessity of whether or not transmission of the unique data acquired in the host vehicle is necessary on the basis of at least one of a traveling state of the host vehicle or a surrounding environment of the host vehicle; step ST3 of transmitting, by the unique data transmitting unit 12, the unique data acquired in the host vehicle in a case where the unique data transmission necessity determining unit 11 determines that the transmission is necessary; step ST13 of determining, by the non-unique data transmission necessity determining unit 17, transmission necessity of whether or not transmission of the non-unique data acquired in the host vehicle is necessary on the basis of at least one of the driving state of the host vehicle or the surrounding environment of the host vehicle in a case where it is determined that the host vehicle is a representative vehicle among the multiple vehicles 1 using the unique data acquired in the multiple vehicles 1; and step ST14 of transmitting, by the non-unique data transmitting unit 18, the non-unique data acquired in the host vehicle in a case where the non-unique data transmission necessity determining unit 17 determines that the transmission is necessary. As a result, the total amount of data transmitted and received in the data collection system 5 can be reduced.

Second Embodiment

Figure 13:
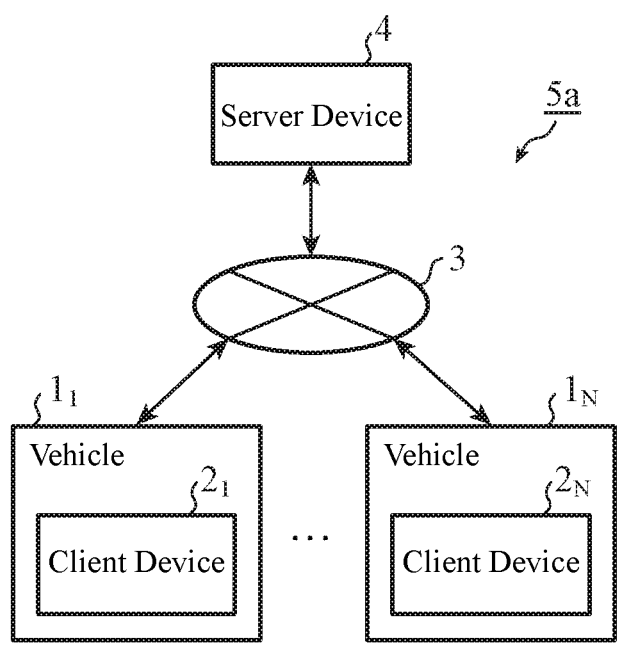
FIG. 13 is a block diagram illustrating a system configuration of a data collection system according to a second embodiment.
Figure 14:
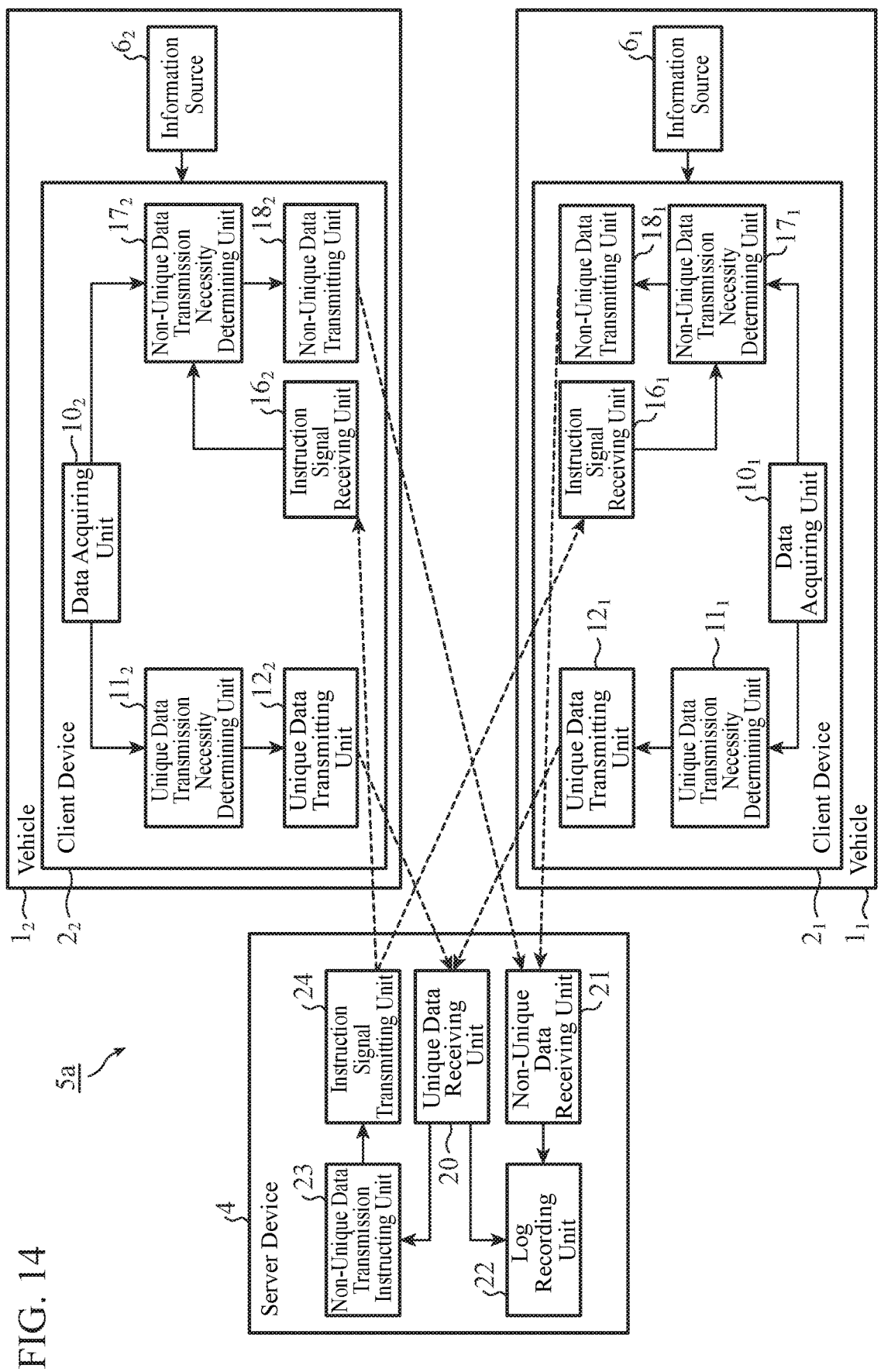
FIG. 14 is a block diagram illustrating main parts of client devices and a server device included in the data collection system according to the second embodiment.

FIG. 13 is a block diagram illustrating a system configuration of a data collection system according to a second embodiment. FIG. 14 is a block diagram illustrating main parts of client devices and a server device included in the data collection system according to the second embodiment. A data collection system 5a according to the second embodiment will be described with reference to FIGS. 13 and 14.

Note that in FIG. 13 the same symbol is given to a block similar to that illustrated in FIG. 1, and description thereof is omitted. In FIG. 14, the same symbol is given to a block similar to that illustrated in FIG. 8, and description thereof is omitted.

In the data collection system 5 of the first embodiment, the non-unique data transmission instructing unit 14 is installed in the client device 2, and determination of a representative vehicle is executed by the client device 2. Meanwhile in the data collection system 5a of the second embodiment, a non-unique data transmission instructing unit 23 is installed in the server device 4, and determination of a representative vehicle is executed by the server device 4.

That is, in the example of N=2 (see FIG. 14), a unique data transmitting unit $12_1$ transmits unique data acquired by a data acquiring unit $10_1$ to the server device 4 in a case where a unique data transmission necessity determining unit $11_1$ determines that the transmission is necessary. A unique data transmitting unit $12_2$ transmits the unique data acquired by the data acquiring unit $10_2$ to the server device 4 in a case where the unique data transmission necessity determining unit $11_2$ determines that the transmission is necessary.

A unique data receiving unit 20 receives the unique data transmitted by the unique data transmitting units $12_1$ and $12_2$. The non-unique data transmission instructing unit 23 determines a representative vehicle among the multiple vehicles $1_1$ and $1_2$ using the unique data received by the unique data receiving unit 20 (i.e., unique data acquired by the multiple vehicles $1_1$ and $1_2$). Since the method of determining the representative vehicle by the non-unique data transmission instructing unit 23 is similar to the method of determining the representative vehicle by the non-unique data transmission instructing unit 14, detailed description will be omitted. The non-unique data transmission instructing unit 23 outputs a signal indicating the result of the determination, that is, a non-unique data transmission instruction signal.

An instruction signal transmitting unit 24 transmits the instruction signal output by the non-unique data transmission instructing unit 23 to client devices $2_1$ and $2_2$. The instruction signal receiving units $16_1$ and $16_2$ receive the instruction signal transmitted by the instruction signal transmitting unit 24.

The client device $2_1$ includes the data acquiring unit $10_1$, the unique data transmission necessity determining unit $11_1$, the unique data transmitting unit $12_1$, the instruction signal receiving unit $16_1$, the non-unique data transmission necessity determining unit $17_1$, and the non-unique data transmitting unit $18_1$. The client device $2_2$ includes the data acquiring unit $10_2$, the unique data transmission necessity determining unit $11_2$, the unique data transmitting unit $12_2$, the instruction signal receiving unit $16_2$, a non-unique data transmission necessity determining unit $17_2$, and a non-unique data transmitting unit $18_2$. The server device 4 includes the unique data receiving unit 20, a non-unique data receiving unit 21, a log recording unit 22, the non-unique data transmission instructing unit 23, and the instruction signal transmitting unit 24.

The hardware configuration of the client device $2_1$ for the data collection system 5a is similar to that described in the first embodiment with reference to FIG. 3, and thus illustration and description thereof is omitted. The hardware configuration of the client device $2_2$ for the data collection system 5a is similar to that described in the first embodiment with reference to FIG. 4, and thus illustration and description thereof is omitted.

Next, a hardware configuration of the server device 4 for the data collection system 5a will be described with reference to FIG. 15.

Figure 15A:
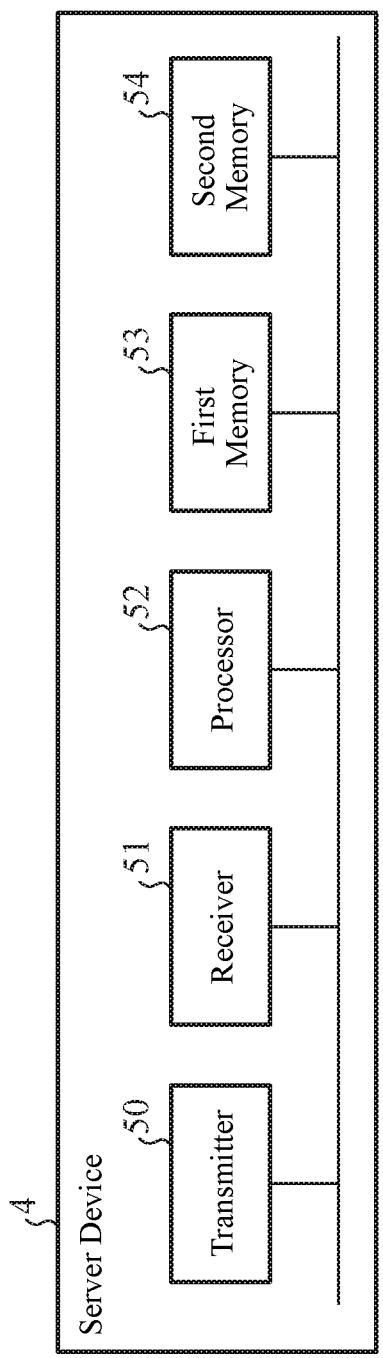
FIG. 15A is a block diagram illustrating a hardware configuration of the server device included in the data collection system according to the second embodiment.

As illustrated in FIG. 15A, the server device 4 includes a transmitter 50, a receiver 51, a processor 52, a first memory 53, and a second memory 54. The function of the instruction signal transmitting unit 24 is implemented by the transmitter 50. The functions of the unique data receiving unit 20 and the non-unique data receiving unit 21 are implemented by the receiver 51. The first memory 53 stores a program for implementing the function of the non-unique data transmission instructing unit 23. The function of the non-unique data transmission instructing unit 23 is implemented by the processor 52 reading and executing the program stored in the first memory 53. The function of the log recording unit 22 is implemented by the second memory 54.

Figure 15B:
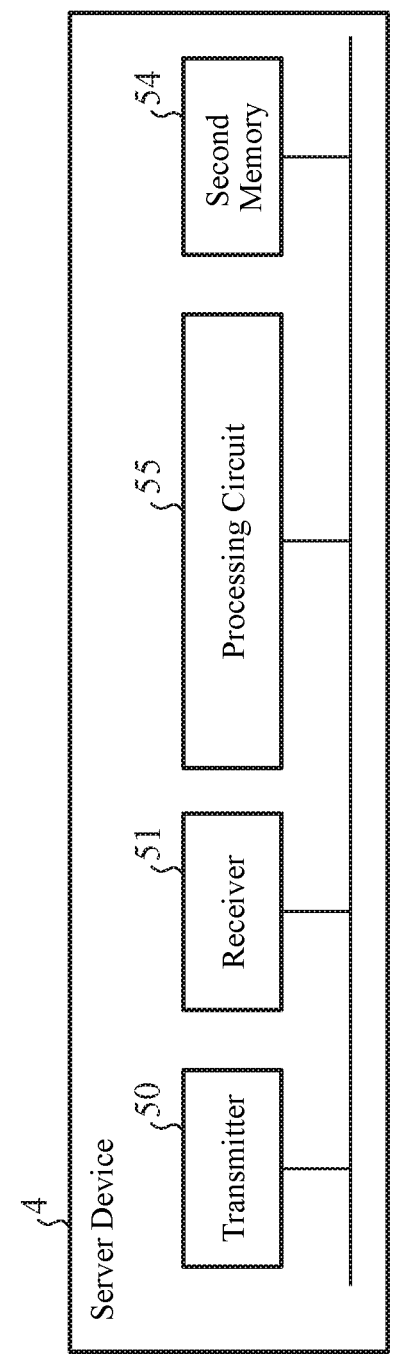
FIG. 15B is a block diagram illustrating another hardware configuration of the server device included in the data collection system according to the second embodiment.

Alternatively, as illustrated in FIG. 15B, the server device 4 may include the transmitter 50, the receiver 51, a processing circuit 55, and the second memory 54. In this case, the function of the non-unique data transmission instructing unit 23 may be implemented by the processing circuit 55.

Alternatively, the server device 4 may include the transmitter 50, the receiver 51, the processor 52, the first memory 53, the processing circuit 55, and the second memory 54. In this case, some of the function of the non-unique data transmission instructing unit 23 may be implemented by the processor 52 and the first memory 53 with the remaining functions implemented by the processing circuit 55.

Since specific examples of the processor 52 are similar to the specific examples of the processor $32_1$ illustrated in FIG.

3A and the specific examples of the processor $32_2$ illustrated in FIG. 4A, detailed description will be omitted. Since specific examples of the first memory 53 are similar to the specific examples of the memory $33_1$ illustrated in FIG. 3A and the specific examples of the memory $33_2$ illustrated in FIG. 4A, detailed description will be omitted. Since specific examples of the processing circuit 55 are similar to the specific examples of the processing circuit $34_1$ illustrated in FIG. 3B and the specific examples of the processing circuit $34_2$ illustrated in FIG. 4B, detailed description will be omitted. Since specific examples of the second memory 54 are similar to the specific examples of the memory 41 illustrated in FIG. 5, detailed description will be omitted.

Figure 6:
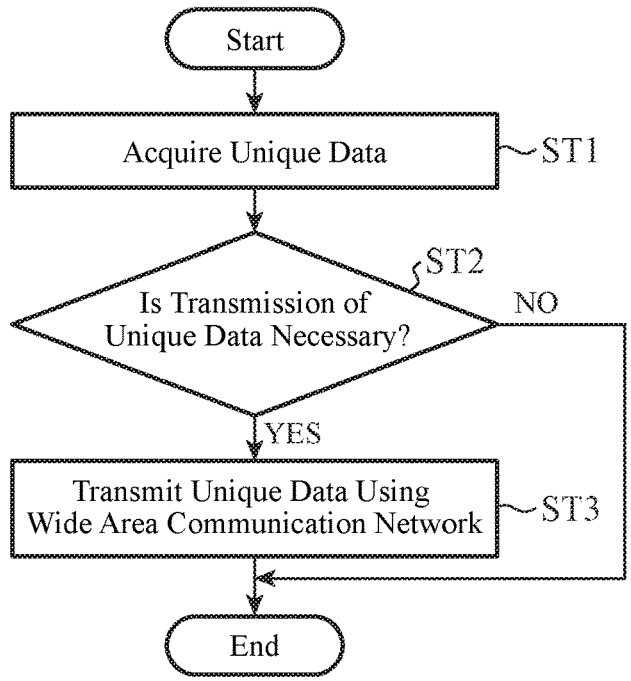
FIG. 6 is a flowchart illustrating an operation of each client device included in the data collection system according to the first embodiment.

Since operations of a data acquiring unit 10, a unique data transmission necessity determining unit 11, and a unique data transmitting unit 12 in each of the client devices 2 are similar to those described in the first embodiment with reference to FIG. 6, illustration and explanation are omitted.

Figure 7:
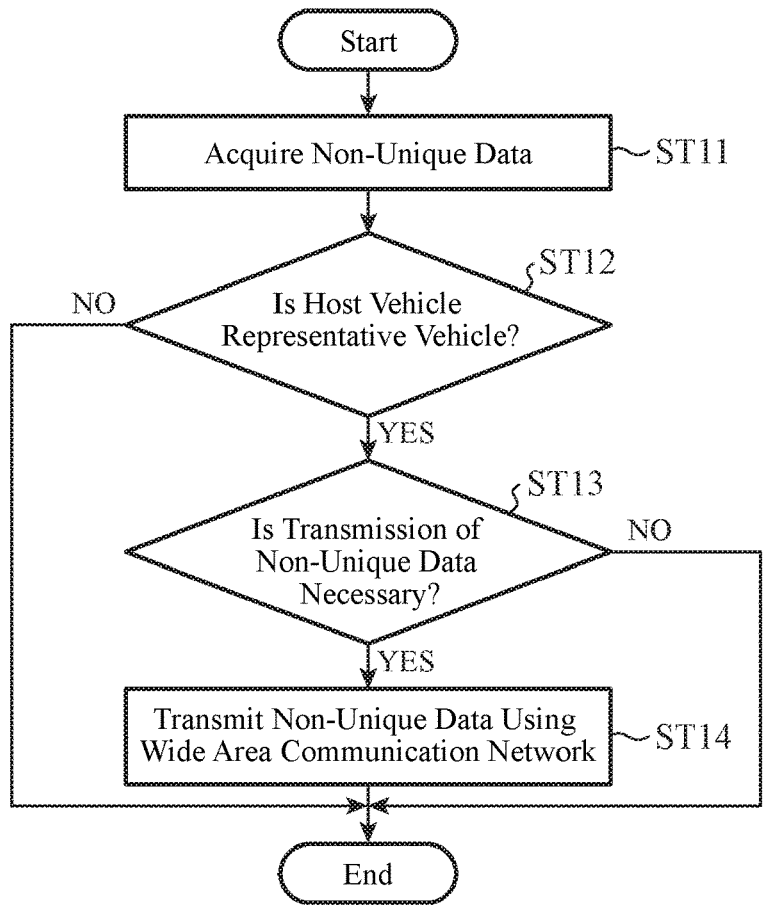
FIG. 7 is a flowchart illustrating an operation of each client device included in the data collection system according to the first embodiment.

Since operations of a data acquiring unit 10, a non-unique data transmission necessity determining unit 17, and a non-unique data transmitting unit 18 in each of the client devices 2 are similar to those described in the first embodiment with reference to FIG. 7, illustration and explanation are omitted.

As described above, in the data collection system 5a of the second embodiment, the necessity of transmission of individual pieces of collection target data is determined, and only collection target data, transmission of which is determined to be necessary, is transmitted to the server device 4. In particular, determination of necessity of transmission of non-unique data and transmission of the non-unique data are executed only in the representative vehicle. As a result, the total amount of data transmitted and received in the data collection system 5a can be reduced.

Note that the non-unique data transmission instructing unit 23 may specify a type of data to be transmitted as non-unique data by the representative vehicle in addition to determining the representative vehicle. The non-unique data transmission instruction signal may indicate the specified type of data in addition to the determination result of the representative vehicle. In the client device 2 installed in the representative vehicle, the data acquiring unit 10 may acquire the specified type of data, and the non-unique data transmitting unit 18 may transmit the specified type of data as non-unique data.

In a case where the non-unique data transmission instructing unit 23 specifies the type of data, exceptionally, data unique to each representative vehicle (that is, data that originally is to be classified as unique data) may be designated as transmission targets as non-unique data.

For example, let us assume that data indicating the vibration state of a vehicle of a specific model is additionally required in an analysis using the log after unique data of each of the vehicles 1 is transmitted to the server device 4. In this case, the non-unique data transmission instructing unit 23 determines a vehicle of that model among the multiple vehicles 1 as a representative vehicle. The non-unique data transmission instructing unit 23 further designates data indicating the vibration state as a transmission target. This makes it possible to collect data that is additionally required in the analysis.

Figure 16:
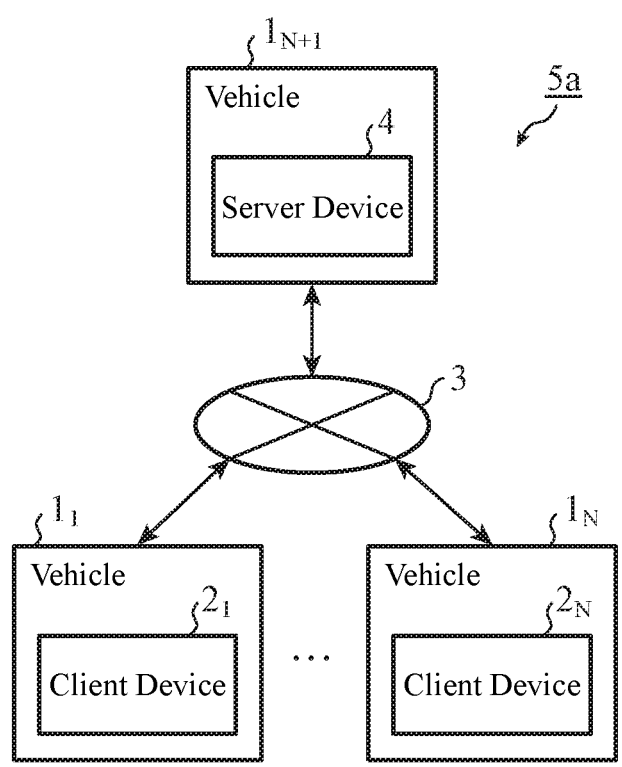
FIG. 16 is a block diagram illustrating a system configuration of another data collection system according to the second embodiment.
Figure 17:
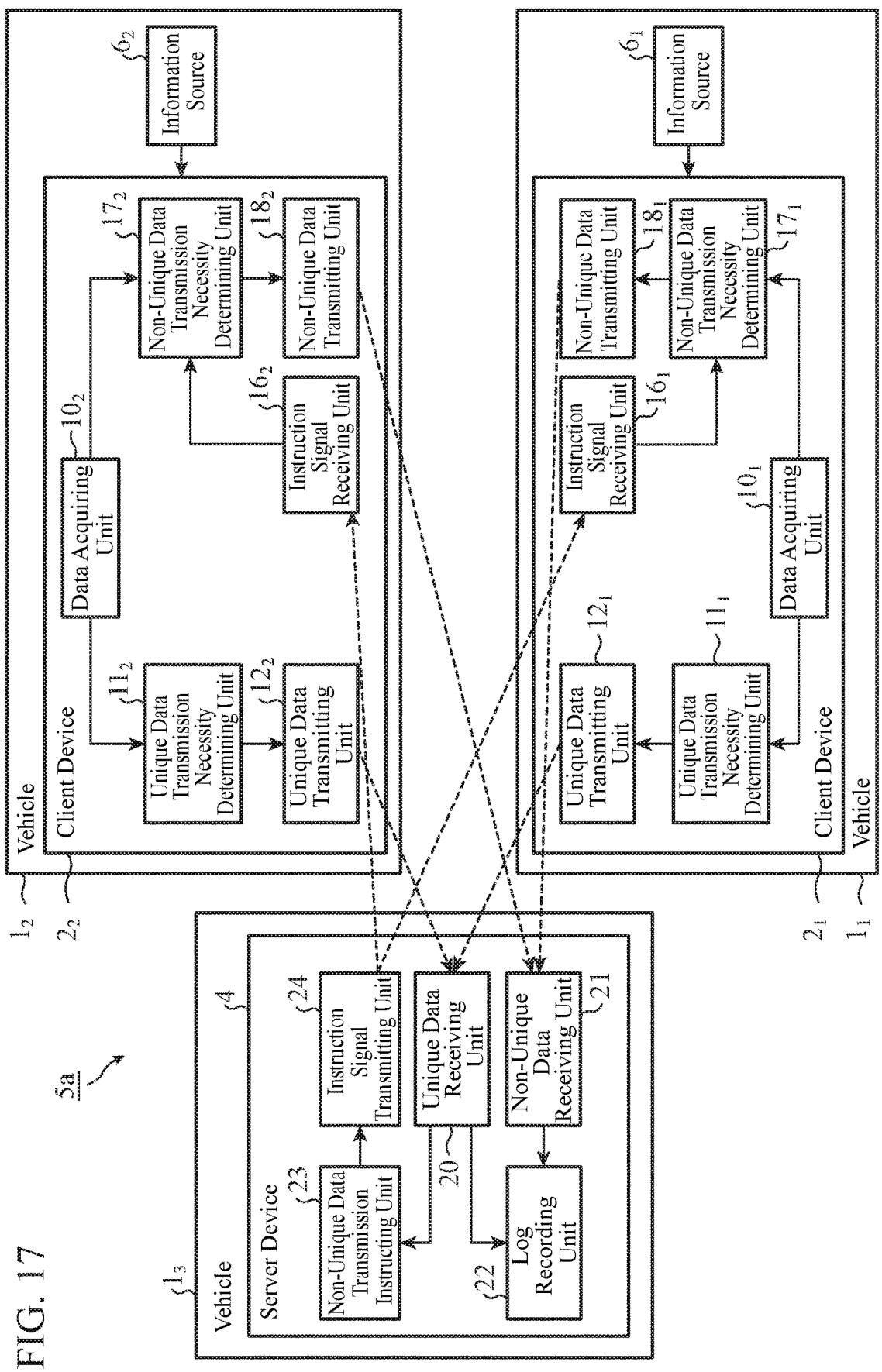
FIG. 17 is a block diagram illustrating main parts of client devices and a server device included in another data collection system according to the second embodiment.

Meanwhile, the server device 4 may be mounted on a vehicle. For example, as illustrated in FIG. 16, the server device 4 may be installed in a vehicle $1_{N+1}$. As illustrated in FIG. 17, in the example where N=2, the server device 4 may be installed in a vehicle $1_3$.

Figure 18:
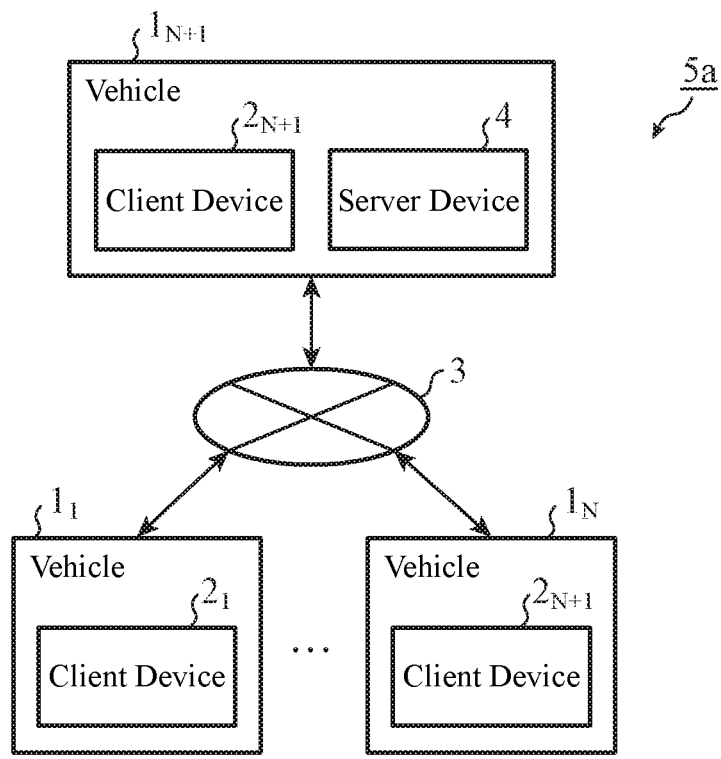
FIG. 18 is a block diagram illustrating a system configuration of another data collection system according to the second embodiment.

Furthermore, in a case where the server device 4 is mounted on a vehicle, a client device 2 may be installed in a vehicle 1 on which the server device 4 is installed. For example, as illustrated in FIG. 18, the vehicle $1_{N+1}$ may be installed with the server device 4 and the client device $2_{N+1}$. In this case, the server device 4 and the client device $2_{N+1}$ may be integrated in the vehicle $1_{N+1}$.

In addition, the data collection system 5a can employ various modifications similar to those described in the first embodiment, that is, various modifications similar to the data collection system 5.

As described above, in the client device 2 of the second embodiment, the non-unique data transmission instructing unit 23 installed in the server device 4 for the data collection system 5a determines the representative vehicle among the multiple vehicles 1 using the unique data acquired in the multiple vehicles 1. As a result, the server device 4 can execute determination of a representative vehicle.

Meanwhile, the non-unique data transmission instructing unit 23 specifies a type of data to be transmitted as non-unique data by the representative vehicle. As a result, exceptionally, unique data in the representative vehicle can be transmitted as non-unique data.

The data collection system 5a of the second embodiment is for collecting multiple types of data including unique data and non-unique data acquired in multiple vehicles 1, multiple client devices being installed in the multiple vehicles, respectively, each of the multiple client devices 2 being able to freely communicable with the server device 4, in which each of the multiple client devices 2 includes: the unique data transmission necessity determining unit 11 determining transmission necessity of whether or not transmission of the unique data acquired in a corresponding vehicle among the multiple vehicles 1 is necessary on the basis of at least one of a traveling state of the corresponding vehicle or a surrounding environment of the corresponding vehicle; the unique data transmitting unit 12 transmitting the unique data acquired in the corresponding vehicle in a case where the unique data transmission necessity determining unit 11 determines that the transmission is necessary; the non-unique data transmission necessity determining unit 17 determining transmission necessity of whether or not transmission of the non-unique data acquired in the corresponding vehicle is necessary on the basis of at least one of the driving state of the corresponding vehicle or the surrounding environment of the corresponding vehicle in a case where it is determined that the corresponding vehicle is a representative vehicle among the multiple vehicles 1 using the unique data acquired in the multiple vehicles 1; and the non-unique data transmitting unit 18 transmitting the non-unique data acquired in the corresponding vehicle in a case where the non-unique data transmission necessity determining unit 17 determines that the transmission is necessary, and the server device 4 includes the non-unique data transmission instructing unit 23 determining the representative vehicle among the multiple vehicles 1 using the unique data acquired in the multiple vehicles 1. As a result, the total amount of data transmitted and received in the data collection system 5a can be reduced.

Third Embodiment

Figure 19:
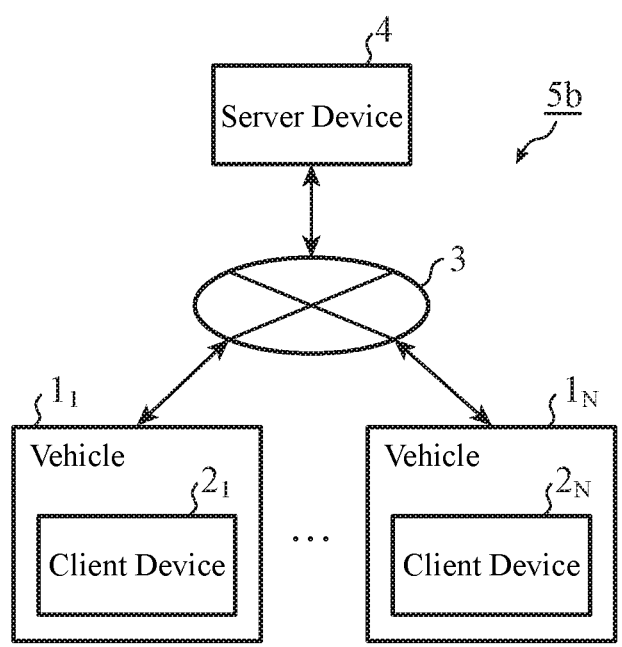
FIG. 19 is a block diagram illustrating a system configuration of a data collection system according to a third embodiment.
Figure 20:
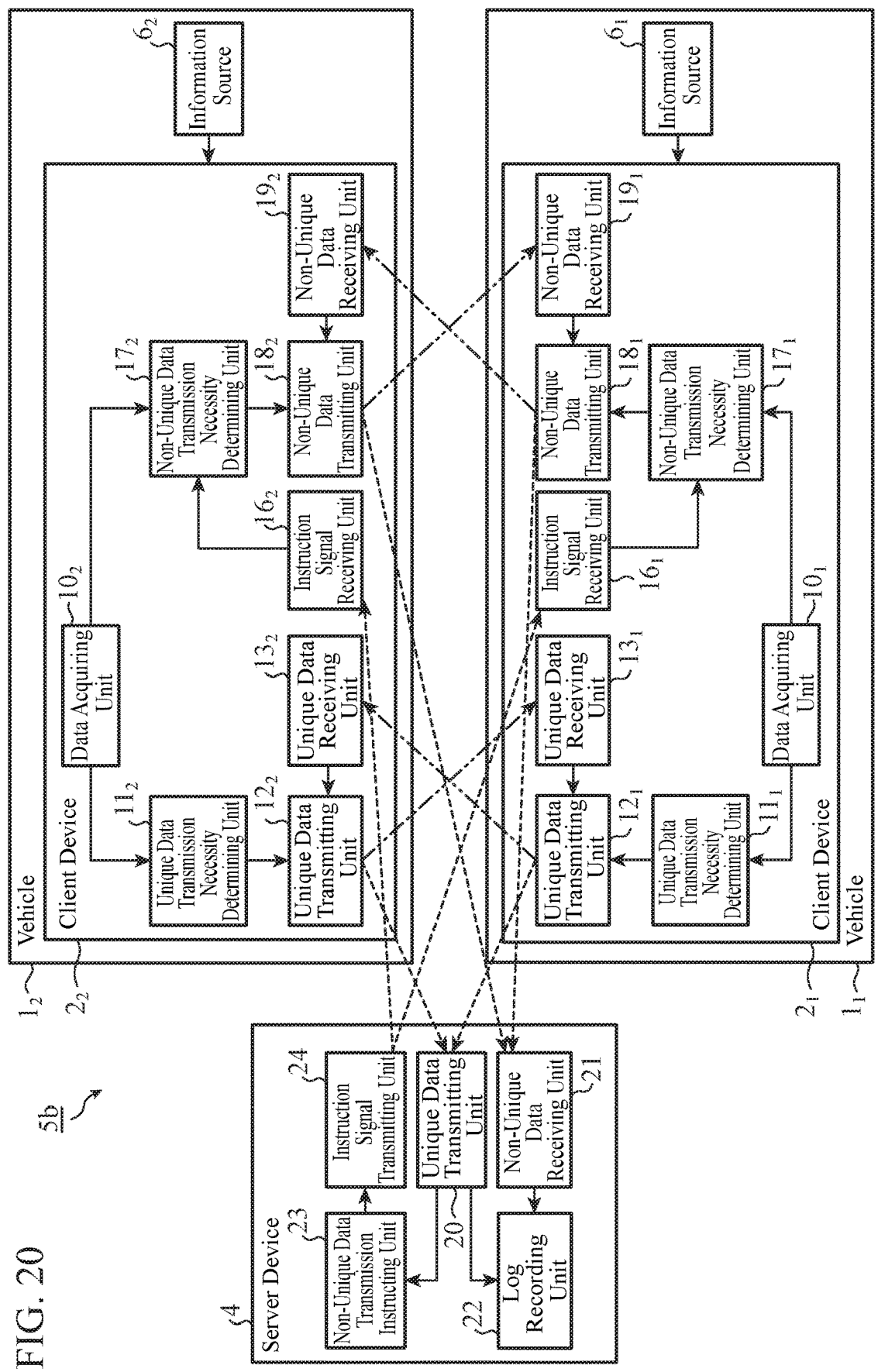
FIG. 20 is a block diagram illustrating main parts of client devices and a server device included in the data collection system according to the third embodiment.

FIG. 19 is a block diagram illustrating a system configuration of a data collection system according to a third embodiment. FIG. 20 is a block diagram illustrating main parts of client devices and a server device included in the data collection system according to the third embodiment. A data collection system 5b according to the third embodiment will be described with reference to FIGS. 19 and 20.

Note that in FIG. 19 the same symbol is given to a block similar to that illustrated in FIG. 1, and description thereof is omitted. In FIG. 20, the same symbol is given to a block similar to that illustrated in FIG. 8, and description thereof is omitted. Note that in FIG. 20 the same symbol is given to a block similar to that illustrated in FIG. 14, and description thereof is omitted.

In the data collection system 5b according to the third embodiment, multiple client devices 2 can freely communicate with each other using a wide area communication network 3. The multiple client devices 2 can also freely communicate with each other by so-called "inter-vehicle communication" without passing through the wide area communication network 3.

In a case where transmission of unique data using the wide area communication network 3 is not possible (for example, the state in which a connection timeout has occurred), a unique data transmitting unit 12 in each of the client devices 2 has the function of transmitting the unique data acquired by a data acquiring unit 10 (i.e., unique data acquired in the host vehicle) to one or more vehicles of other vehicles (i.e. surrounding vehicles) traveling in the surrounding area of the host vehicle by inter-vehicle communication.

A unique data receiving unit 13 in each of the client devices 2 has the function of receiving the unique data transmitted by inter-vehicle communication (that is, unique data acquired in other vehicles).

The unique data transmitting unit 12 in each of the client devices 2 has the function of transmitting the unique data received by inter-vehicle communication (i.e., unique data acquired in other vehicles) to the server device 4 using the wide area communication network 3 when transmission of the unique data using the wide area communication network 3 becomes possible. At this point, the unique data received by the inter-vehicle communication (i.e., unique data acquired in the other vehicles) may be transmitted together with the unique data acquired by the data acquiring unit 10 (i.e., unique data acquired in the host vehicle).

In a case where transmission of non-unique data using the wide area communication network 3 is not possible (for example, the state in which a connection timeout has occurred), a non-unique data transmitting unit 18 in each of the client devices 2 has the function of transmitting the non-unique data acquired by the data acquiring unit 10 (i.e., non-unique data acquired in the host vehicle) to one or more vehicles of other vehicles (i.e. surrounding vehicles) traveling in the surrounding the host vehicle by inter-vehicle communication.

A non-unique data receiving unit 19 in each of the client devices 2 has the function of receiving the non-unique data transmitted by inter-vehicle communication (that is, non-unique data acquired in other vehicles).

The non-unique data transmitting unit 18 in each of the client devices 2 has the function of transmitting the non-unique data received by inter-vehicle communication (i.e., unique data acquired in other vehicles) to the server device 4 using the wide area communication network 3 when transmission of the non-unique data using the wide area communication network 3 becomes possible. At this point, the non-unique data received by the inter-vehicle communication (i.e., non-unique data acquired in the other vehicles) may be transmitted together with the non-unique data acquired by the data acquiring unit 10 (i.e., non-unique data acquired in the host vehicle).

Note that a dashed arrow in FIG. 20 corresponds to data or a signal transmitted and received using the wide area communication network 3. A two-dot chain arrow in FIG. 20 corresponds to data transmitted and received by inter-vehicle communication.

A client device $2_1$ includes a data acquiring unit $10_1$, a unique data transmission necessity determining unit $11_1$, a unique data transmitting unit $12_1$, a unique data receiving unit $13_1$, an instruction signal receiving unit $16_1$, a non-unique data transmission necessity determining unit $17_1$, a non-unique data transmitting unit $18_1$, and a non-unique data receiving unit $19_1$. A client device $2_2$ includes a data acquiring unit $10_2$, a unique data transmission necessity determining unit $11_2$, a unique data transmitting unit $12_2$, a unique data receiving unit $13_2$, an instruction signal receiving unit $16_2$, a non-unique data transmission necessity determining unit $17_2$, a non-unique data transmitting unit $18_2$, and a non-unique data receiving unit $19_2$. The server device 4 includes the unique data receiving unit 20, a non-unique data receiving unit 21, a log recording unit 22, the non-unique data transmission instructing unit 23, and the instruction signal transmitting unit 24.

The hardware configuration of the client device $2_1$ for the data collection system 5b is similar to that described in the first embodiment with reference to FIG. 3, and thus illustration and description thereof is omitted. The hardware configuration of the client device $2_2$ for the data collection system 5b is similar to that described in the first embodiment with reference to FIG. 4, and thus illustration and description thereof is omitted. The hardware configuration of the server device 4 for the data collection system 5b is similar to that described in the second embodiment with reference to FIG. 15, and thus illustration and description thereof is omitted.

As described above, in the data collection system 5b of the third embodiment, each of the client devices 2 transmits collection target data to one or more vehicles of surrounding vehicles by inter-vehicle communication when transmission of the collection target data using the wide area communication network 3 is impossible (so-called "distributed transmission"). Furthermore, each of the client devices 2 transmits collection target data received by inter-vehicle communication to the server device 4 using the wide area communication network 3 when transmission of the collection target data using the wide area communication network 3 becomes possible. As a result, the server device 4 can more reliably collect collection target data acquired in each of the vehicles 1.

Note that the unique data transmitting unit 12 in each of the client devices 2 may set all of the surrounding vehicles as the transmission destinations of unique data by inter-vehicle communication (so-called "broadcasting"). Likewise, the non-unique data transmitting unit 18 in each of the client devices 2 may set all of the surrounding vehicles as the transmission destinations of non-unique data by inter-vehicle communication.

Alternatively, the unique data transmitting unit 12 in each of the client devices 2 may randomly select one or more vehicles from the surrounding vehicles and set the selected one or more vehicles as the transmission destinations of the unique data by inter-vehicle communication. Similarly, the non-unique data transmitting unit 18 in each of the client devices 2 may randomly select one or more vehicles from the surrounding vehicles and set the selected one or more vehicles as the transmission destinations of the non-unique data by inter-vehicle communication.

Alternatively, the multiple client devices 2 may share information indicating the destination of each of the vehicles 1. The unique data transmitting unit 12 in each of the client devices 2 may select, from the surrounding vehicles using the shared information, one or more vehicles having a high probability that transmission of unique data using the wide area communication network 3 at a destination becomes possible, and set the selected one or more vehicles as the transmission destinations of the unique data by the inter-vehicle communication. Similarly, the non-unique data transmitting unit 18 in each of the client devices 2 may select, from the surrounding vehicles using the shared information, one or more vehicles having a high probability that transmission of non-unique data using the wide area communication network 3 at a destination becomes possible, and set the selected one or more vehicles as the transmission destinations of the non-unique data by the inter-vehicle communication.

Figure 21:
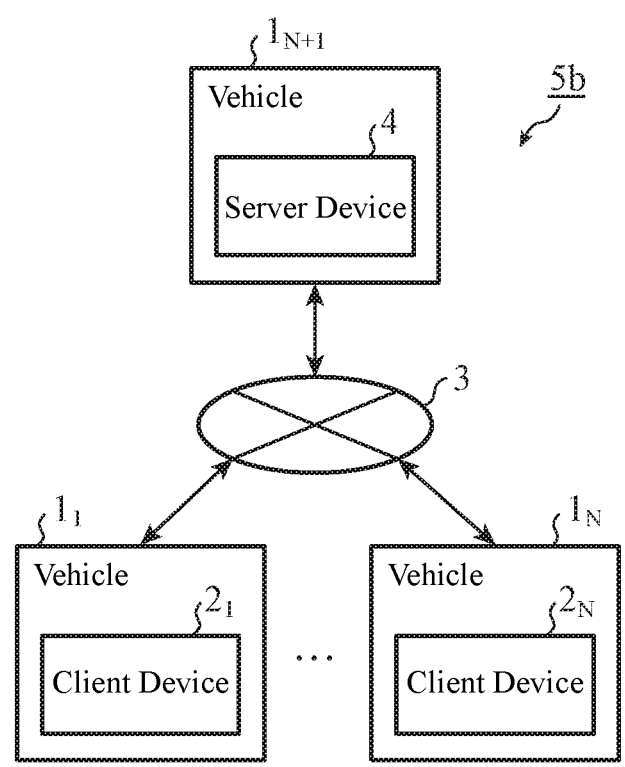
FIG. 21 is a block diagram illustrating a system configuration of another data collection system according to the third embodiment.
Figure 22:
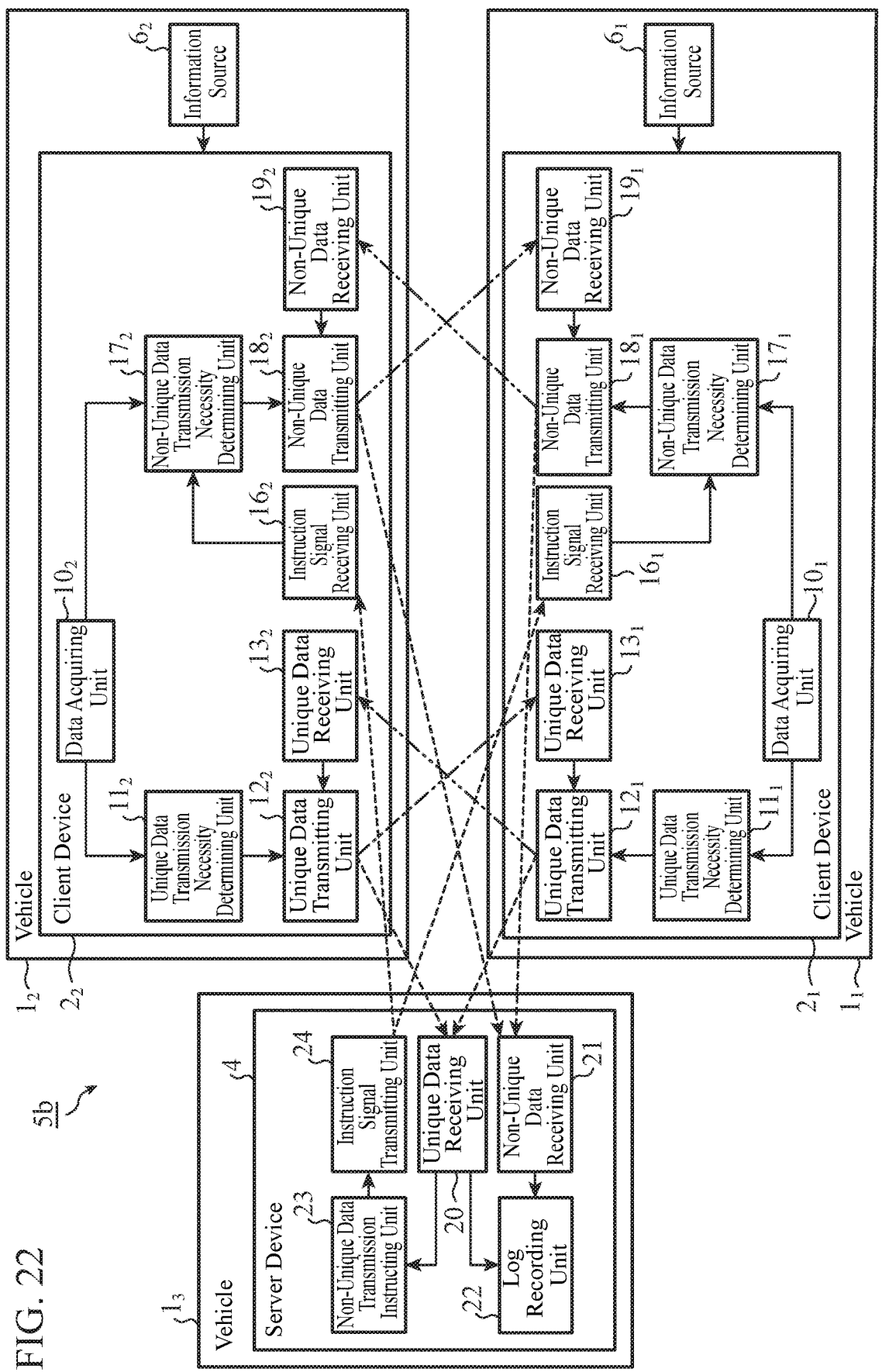
FIG. 22 is a block diagram illustrating main parts of client devices and a server device included in another data collection system according to the third embodiment.

Further, the server device 4 may be mounted on a vehicle. For example, as illustrated in FIG. 21, the server device 4 may be installed in a vehicle $1_{N+1}$. As illustrated in FIG. 22, in the example where N=2, the server device 4 may be installed in a vehicle $1_3$.

Figure 23:
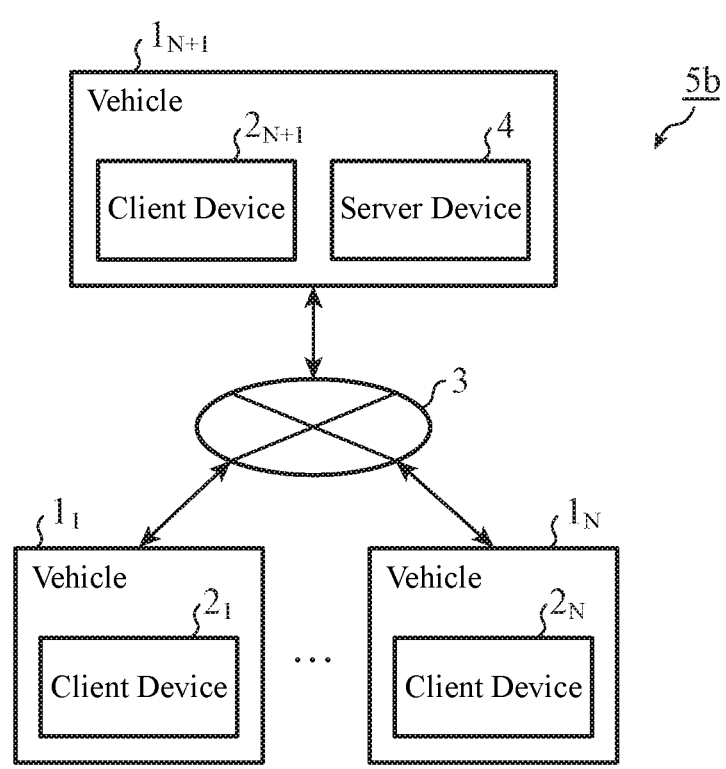
FIG. 23 is a block diagram illustrating a system configuration of still another data collection system according to the third embodiment.

Furthermore, in a case where the server device 4 is mounted on a vehicle, a client device 2 may be installed in a vehicle 1 on which the server device 4 is installed. For example, as illustrated in FIG. 23, the vehicle $1_{N+1}$ may be installed with the server device 4 and the client device $2_{N+1}$. In this case, the server device 4 and the client device $2_{N+1}$ may be integrated in the vehicle $1_{N+1}$.

Alternatively, instead of the system configuration in which determination of a representative vehicle is executed by the server device 4 (that is, the system configuration illustrated in FIG. 20 or FIG. 22), the data collection system 5b may employ a system configuration in which determination of a representative vehicle is executed by a client device 2 (that is, a system configuration similar to that illustrated in the first embodiment), added with functions related to inter-vehicle communication similar to the above examples. In this case, the destination of unique data by each of the client devices 2 using the wide area communication network 3 is the server device 4 or another client device 2 (more specifically, a client device 2 that executes determination of a representative vehicle).

In addition, the data collection system 5b can employ various modifications similar to those described in the first embodiment, that is, various modifications similar to the data collection system 5.

As described above, in the data collection system 5b of the third embodiment, the unique data transmitting unit 12 in each of the client devices 2 transmits the unique data acquired in the host vehicle to one or more of a plurality of the other vehicles (surrounding vehicles) traveling in the surrounding area of the host vehicle by inter-vehicle communication in a case where transmission of the unique data using the wide area communication network 3 is not possible. This can implement distributed transmission of unique data by inter-vehicle communication.

Furthermore, each of the client devices 2 includes a unique data receiving unit 13 receiving unique data transmitted by inter-vehicle communication, and a unique data transmitting unit 12 transmits the unique data received by inter-vehicle communication using the wide area communication network 3 when transmission of the unique data using the wide area communication network 3 becomes possible. This configuration can be implement substitute transmission of unique data acquired in another vehicle.

Moreover, the non-unique data transmitting unit 18 in each of the client devices 2 transmits non-unique data acquired in the host vehicle to one or more of a plurality of the other vehicles (surrounding vehicles) traveling in the surrounding area of the host vehicle by inter-vehicle communication in a case where transmission of the non-unique data using the wide area communication network 3 is not possible. This can implement distributed transmission of non-unique data by inter-vehicle communication.

Furthermore, each of the client devices 2 includes a non-unique data receiving unit 19 receiving non-unique data transmitted by inter-vehicle communication, and a non-unique data transmitting unit 18 transmits the non-unique data received by inter-vehicle communication using the wide area communication network 3 when transmission of the non-unique data using the wide area communication network 3 becomes possible. This configuration can be implement substitute transmission of non-unique data acquired in another vehicle.

Note that the present invention may include a flexible combination of each of the embodiments, a modification of any component of the embodiments, or an omission of any component in the embodiments within the scope of the present invention.

INDUSTRIAL APPLICABILITY

A client device, a data transmission method, and a data collection system of the present invention can be used for collecting multiple types of data acquired in multiple vehicles.

REFERENCE SIGNS LIST

1: vehicle, 2: client device, 3: wide area communication network, 4: server device, 5, 5a, 5b: data collection system, 6: information source, 10: data acquiring unit, 11: unique data transmission necessity determining unit, 12: unique data transmitting unit, 13: unique data receiving unit, 14: non-unique data transmission instructing unit, 15: instruction signal transmitting unit, 16: instruction signal receiving unit, 17: non-unique data transmission necessity determining unit, 18: non-unique data transmitting unit, 19: non-unique data receiving unit, 20: unique data receiving unit, 21: non-unique data receiving unit, 22: log recording unit, 23: non-unique data transmission instructing unit, 24: instruction signal transmitting unit, 30: transmitter, 31: receiver, 32: processor, 33: memory, 34: processing circuit, 40: receiver, 41: memory, 50: transmitter, 51: receiver, 52: processor, 53: first memory, 54: second memory, 55: processing circuit

The invention claimed is:

1. A client device, installed in a host vehicle, of a data collection system for collecting multiple types of data acquired in multiple vehicles including the host vehicle and other vehicles, the client device comprising a processing circuitry, to acquire unique data unique to the host vehicle;
to acquire non-unique data not unique to the host vehicle;
to transmit the acquired unique data when at least one of a traveling state of the host vehicle and an environment surrounding the host vehicle meets a first predetermined criteria;
to determine whether the host vehicle is a representative vehicle by detecting at least one of a traveling speed of the host vehicle, an amount of fuel remaining in the host vehicle, and a communication amount by the host vehicle within a preceding predetermined period of time; and to transmit, when the host vehicle is the representative vehicle, the non-unique data when at least one of the traveling state of the host vehicle and the environment surrounding the host vehicle meets a second predetermined criteria.

2. The client device according to claim 1, wherein the other vehicles also acquire unique data, and the processing circuitry further performs, to receive the unique data acquired in the other vehicles; and to determine the representative vehicle among the multiple vehicles using the unique data acquired in the host vehicle and the other vehicles.

3. The client device according to claim 1, wherein the transmission of the unique data is necessary is determined in accordance with a condition different for each type of the unique data.

4. The client device according to claim 1, wherein the transmission of the non-unique data is determined in accordance with a condition different for each type of the non-unique data.

5. The client device according to claim 1, wherein in the transmission of the unique data, a transmission order of the unique data is different depending on a priority set for each type of the unique data.

6. The client device according to claim 1, wherein in the transmission of the non-unique data, a transmission order of the non-unique data is different depending on a priority set for each type of the non-unique data.

7. The client device according to claim 5, wherein the priority is set to a value which is different depending on a personal authentication process for a passenger of the host vehicle.

8. The client device according to claim 2,
wherein the unique data indicates a position of the other vehicles, and
each of one the other vehicles traveling in a surrounding area of the host vehicle is also determined as representative vehicles.

9. The client device according to claim 2,
wherein the unique data indicates a traveling state of each of the other vehicles, and
the representative vehicle is determined among the other vehicles from the traveling state of each of the other vehicles.

10. The client device according to claim 1, wherein a server device for the data collection system specifies a type of data to be transmitted as the non-unique data by the representative vehicle.

11. The client device according to claim 1, wherein, when transmission of the unique data using a wide area communication network is not possible, the unique data acquired in the host vehicle is transmitted to one or more of the other vehicles traveling in a surrounding area of the host vehicle by inter-vehicle communication.

12. The client device according to claim 11, wherein the processing circuitry further performs:

to receive the unique data transmitted by the inter-vehicle communication; and to transmit the unique data received by the inter-vehicle communication using the wide area communication network when transmission of the unique data using the wide area communication network becomes possible.

13. The client device according to claim 1, wherein, when transmission of the non-unique data using a wide area communication network is not possible, the non-unique data acquired in the host vehicle is transmitted to one or more of the other vehicles traveling in a surrounding area of the host vehicle by inter-vehicle communication.

14. The client device according to claim 13, wherein the other vehicles also acquire unique data, and the processing circuitry further performs, to receive the non-unique data, acquired in the other vehicles, transmitted by the inter-vehicle communication; and to transmit the non-unique data received by the inter-vehicle communication using the wide area communication network when transmission of the non-unique data using the wide area communication network becomes possible.

15. A data transmission method by a client device, installed in a host vehicle, of a data collection system for collecting multiple types of data acquired in multiple vehicles including the host vehicle and other vehicles, the data transmission method comprising:

acquiring unique data unique to the host vehicle;
acquiring non-unique data not unique to the host vehicle;
to transmit the acquired unique data when at least one of a traveling state of the host vehicle and an environment surrounding the host vehicle meets a first predetermined criteria;

determining whether the host vehicle is a representative vehicle by detecting at least one of a traveling speed of the host vehicle, an amount of fuel remaining in the host vehicle, and a communication amount by the host vehicle within a preceding predetermined period of time; and transmitting, when the host vehicle is the representative vehicle, the non-unique data when at least one of the traveling state of the host vehicle and the environment surrounding the host vehicle meets a second predetermined criteria.

16. A data collection system for collecting multiple types of data, the data collection system comprising:

client devices installed in each of multiple vehicles, client devices being able to freely communicate with a server device, wherein each of the multiple client devices comprises a processing circuitry, to acquire unique data unique a corresponding vehicle;
to acquire non-unique data not unique to the corresponding vehicle;
to transmit the acquired unique data when at least one of a traveling state of the corresponding vehicle and a surrounding environment of the corresponding vehicle meets a first predetermined criteria; and
to transmit the acquired non-unique data acquired in the corresponding vehicle when at least one of the driving state of the corresponding vehicle and the surrounding environment of the corresponding vehicle meets a second predetermined criteria, wherein the server device comprises a processing circuitry to determine the representative vehicle among the multiple vehicles using the unique data acquired in the multiple vehicles.

* * * * *